(12) United States Patent
Iwasawa et al.

(10) Patent No.: US 10,191,259 B2
(45) Date of Patent: Jan. 29, 2019

(54) ZOOM LENS AND CAMERA DEVICE

(71) Applicant: TAMRON CO., LTD., Saitama-shi, Saitama (JP)

(72) Inventors: Yoshito Iwasawa, Tokyo (JP); Jun Takahashi, Ashigarakami-gun (JP)

(73) Assignee: TAMRON CO., LTD., Saitama-shi (JP)

( * ) Notice: Subject to any disclaimer, the term of this patent is extended or adjusted under 35 U.S.C. 154(b) by 0 days.

(21) Appl. No.: 15/416,532

(22) Filed: Jan. 26, 2017

(65) Prior Publication Data

US 2017/0139189 A1      May 18, 2017

Related U.S. Application Data

(63) Continuation of application No. 14/140,702, filed on Dec. 26, 2013, now Pat. No. 9,594,234.

(30) Foreign Application Priority Data

Dec. 27, 2012    (JP) .................................. 2012-286011

(51) Int. Cl.
　　*G02B 15/173*　　(2006.01)
　　*G02B 15/14*　　(2006.01)
　　*G02B 15/16*　　(2006.01)

(52) U.S. Cl.
　　CPC ........... *G02B 15/173* (2013.01); *G02B 15/14* (2013.01); *G02B 15/16* (2013.01)

(58) Field of Classification Search
　　CPC ........ G02B 15/14; G02B 15/15; G02B 15/16; G02B 15/173; G02B 13/009

(Continued)

(56) References Cited

U.S. PATENT DOCUMENTS 5,241,421 A    8/1993  Endo et al.
5,781,348 A    7/1998  Ohtake
(Continued)

FOREIGN PATENT DOCUMENTS

JP    H03-225308 A    10/1991
JP    10-39215 A    2/1998
(Continued)

OTHER PUBLICATIONS

Office Action dated Oct. 24, 2016, issued in counterpart Japanese Patent Application No. 2012-286011. (7 pages).
(Continued)

*Primary Examiner* — Jordan Schwartz
(74) *Attorney, Agent, or Firm* — Westerman, Hattori, Daniels & Adrian, LLP

(57) ABSTRACT

The zoom lens comprises five or more groups of lens pieces, namely, the foremost or first lens group of positive refractive power located the closest to an object, the succeeding second lens group of negative refractive power, the third lens group of positive refractive power, the fourth lens group of positive refractive power, and the fifth lens group all arranged in this order, and if any, the rearmost lens group(s) closer to the imaging plane than the fifth lens group. The zoom lens meets requirements as defined in the conditional expression regarding a combined magnification of the fifth lens group and, if any, the rearmost lens group(s) closer to the imaging plane than the fifth lens group while the zoom lens is taking a telephoto position.

6 Claims, 20 Drawing Sheets

(58) Field of Classification Search
USPC .................................. 359/676, 683–686
See application file for complete search history.

(56) References Cited

U.S. PATENT DOCUMENTS

| | | | |
|---|---|---|---|
| 6,061,186 A | 5/2000 | Nishio | |
| 7,545,579 B2 | 6/2009 | Sueyoshi et al. | |
| 2005/0168807 A1* | 8/2005 | Endo | G02B 15/173 |
| | | | 359/354 |
| 2007/0139794 A1* | 6/2007 | Misaka | G02B 13/02 |
| | | | 359/781 |
| 2007/0279760 A1 | 12/2007 | Toyoda et al. | |
| 2009/0195885 A1 | 8/2009 | Yamanaka et al. | |
| 2010/0033838 A1 | 2/2010 | Saori | |
| 2011/0007403 A1 | 1/2011 | Matsuo | |
| 2011/0019288 A1 | 1/2011 | Yamanaka et al. | |
| 2011/0176224 A1 | 7/2011 | Sato et al. | |
| 2011/0242675 A1 | 10/2011 | Sugita | |
| 2012/0026602 A1 | 2/2012 | Uchida et al. | |
| 2012/0147253 A1 | 6/2012 | Anzawa et al. | |
| 2013/0033621 A1 | 2/2013 | Maruyama | |
| 2013/0094097 A1 | 4/2013 | Sugita | |
| 2013/0235466 A1* | 9/2013 | Iwamoto | G02B 13/009 |
| | | | 359/683 |
| 2014/0184856 A1 | 7/2014 | Iwasawa et al. | |
| 2017/0139189 A1 | 5/2017 | Iwasawa et al. | |

FOREIGN PATENT DOCUMENTS

| | | | |
|---|---|---|---|
| JP | 10-333039 A | | 12/1998 |
| JP | 11-202201 A | | 7/1999 |
| JP | 2003-344768 A | | 12/2003 |
| JP | 2005-292338 A | | 10/2005 |
| JP | 2009-168933 A | | 7/2009 |
| JP | 2011-17912 | * | 1/2011 |
| JP | 2011-209347 A | | 10/2011 |
| JP | 2011-215218 A | | 10/2011 |
| JP | 2012-053444 A | | 3/2012 |
| JP | 2014-126850 A | | 7/2014 |

OTHER PUBLICATIONS

Office Action dated Jul. 30, 2018, issued in counterpart Japanese Application No. 2017-136225, with English machine translation. (6 pages).

* cited by examiner

ZOOM LENS AND CAMERA DEVICE

CROSS-REFERENCE TO RELATED APPLICATIONS

The present patent application is a Continuation of application Ser. No. 14/140,702, filed Dec. 26, 2013, which claims priority from Japanese Application No. 2012-286011 filed Dec. 27, 2012, both of which are incorporated herein by reference in their entireties.

FIELD OF THE INVENTION

The present invention relates to zoom lenses, interchangeable lens units incorporating the zoom lenses, and camera devices used with the same. More particularly, the present invention relates to high variable power compact zoom lenses suitable to camera optical systems for digitized signal input/output devices such as digital still cameras, digital video cameras, and the like, interchangeable lens units incorporating the high variable power compact zoom lenses, and camera devices used with the same.

BACKGROUND ART

Recently, camera devices, such as digital still cameras, incorporating solid-state image sensors have been popular. This tendency of the market demand has been followed by the performance improvement and downsizing of optical systems, and more compact camera systems have rapidly become commercially available. Optical systems in such camera systems are of higher-performance oriented and increasingly downsizing oriented design to meet the market demand for zoom lens optical systems with a shortened entire length and a reduced diameter. Especially, it is highly desired that optical systems, such as tele-photographing zoom lenses, having an increased focal length should be of more enhanced performance and reduced dimensions.

One prior art tele-photographing zoom lens, which satisfies the desired performance and dimensions to such an extent that the zoom lens has its optical system extended up to 318.283-mm entire length for attaining 490-mm maximum focal length in one embodiment, comprises the foremost or first lens group L1 of positive refractive power located the closest to an object, the succeeding or second lens group L2 of negative refractive power, the third lens group L3 of positive refractive power, the fourth lens group L4 of positive refractive power, the fifth lens group including an aperture stop, and the rearmost or sixth lens group L6 of negative refractive power arranged in this precise order, and the zoom lens has its first, fourth, fifth and sixth lens groups L1, L4, L5 and L6 moved toward the object for varying magnification from the wide-angle position to the telephoto position and has its third lens group L3 moved toward the imaging plane for compensating for field displacement resulting from the varied magnification (e.g., see Patent Document 1 listed below).

Such a prior art zoom lens meets the requirements as defined in the following conditional expression:

With a lens piece the closest to the imaging plane in the lens group L1 being shaped in convex lens, $$0.45 \leq f1/ft \leq 0.58$$

where f1 is a focal length of the first lens group L1, and ft is a focal length of the optical system as a whole at a telephoto position, $$0.25 \leq |f2|/ft \leq 0.35$$

where f2 is a focal length of the second lens group L2, $$0.30 \leq f3/ft \leq 0.35$$

where f3 is a focal length of the third lens group L3, $$0.12 \leq |f6|/ft \leq 0.18$$

where f6 is a focal length of the sixth lens group L6, and $$1.2 \leq m1/m6 \leq 2.0$$

where m1 is a displacement of the first lens group L1 resulting from the variation in magnification, and m6 is a displacement of the sixth lens group L6 resulting from the variation in magnification.

LIST OF DOCUMENTS OF THE RELATED ART

Patent Document 1

Official Gazette of JP-A-2003-344768

The prior art tele-photographing zoom lens mentioned above is still unsatisfactory in that the rearmost lens group exhibits an insufficient magnification at the telephoto end while the zoom lens as a whole is yet undesirably long when taking a telephoto position. Another disadvantage is an undesirably great displacement of the first lens group.

Allowing for the aforementioned disadvantages in the prior art, the present invention is directed to providing an improved zoom lens that attains high-performance imaging suitable to attachment lenses and/or camera devices incorporating solid-state image sensors, such as digital still cameras, digital video cameras, and the like, of which pixels are much more minute than those of photographing film, and providing an improved camera device used with such a zoom lens.

The present invention is also directed to providing an improved zoom lens in which, when the zoom lens takes a telephoto posture, the rearmost lens group(s) exhibits a greater magnification, namely, a greater rate of an angle (in radians) of beams incident upon the rearmost lens group(s) to an angle (in radians) of exiting beams from the same so as to have a reduced extension of an optical system as a whole of the zoom lens at the telephoto end and attain a reduced displacement of the first lens group, and to providing a camera device used with such a zoom lens.

SUMMARY OF THE INVENTION

A zoom lens comprises five or more groups of lens pieces, namely, the foremost or first lens group of positive refractive power located the closest to an object, the succeeding second lens group of negative refractive power, the third lens group of positive refractive power, the fourth lens group of positive refractive power, and the fifth lens group all arranged in this order, and if any, the rearmost lens group(s) closer to the imaging plane than the fifth lens group; and the zoom lens taking a telephoto position meets requirements as defined in the following conditional expression:

$$3.1 \leq \beta bt \leq 4.0 \tag{1}$$

where βbt is a combined lateral magnification of the fifth lens group and, if any, the rearmost lens group(s) closer to the imaging plane than the fifth lens group while the zoom lens is taking a telephoto position.

A camera device comprises solid-state image sensors disposed on or behind the imaging plane of a zoom lens for converting an optical image created by the zoom lens into electrical signals, the zoom lens comprising five or more groups of lens pieces, namely, the foremost or first lens group of positive refractive power located the closest to an object, the succeeding second lens group of negative refractive power, the third lens group of positive refractive power, the fourth lens group of positive refractive power, and the fifth lens group all arranged in this order, and if any, the rearmost lens group(s) closer to the imaging plane than the fifth lens group; the zoom lens in a telephoto position meeting requirements as defined in the following conditional expression (1):

$$3.1 \leq \beta bt \leq 4.0 \quad (1)$$

where βbt is a combined lateral magnification of the fifth lens group and, if any, the rearmost lens group(s) closer to the imaging plane than the fifth lens group while the zoom lens takes a telephoto position.

In accordance with the present invention, the zoom lens, comprising at least five lens groups, namely, the first lens group of positive refractive power, the second lens group of negative refractive power, the third lens group of positive refractive power, the fourth lens group of positive refractive power, and the fifth lens group, is capable of varying five or more dimensional components or distances between the lens groups adjacent to each other during varying its magnification so as to obtain an increased options to compensate for aberrations.

Also, in accordance with the present invention, the zoom lens attains high-performance imaging suitable to the interchangeable lenses and/or camera device incorporating solid-state image sensors, such as digital still cameras, digital video cameras, and the like, of which pixels are much more minute than those of photographing film, and the camera device is suitably used with such a zoom lens.

Moreover, in accordance with the present invention, when the zoom lens takes a telephoto position, the rearmost lens group(s) exhibits a greater magnification, namely, a greater rate of an angle (in radians) of beams incident upon the rearmost lens group(s) to an angle (in radians) of exiting beams from the same so as to have a reduced extension of an optical system as a whole of the zoom lens at the telephoto end and attain a reduced displacement of the first lens group, and the camera device is suitably used with such a zoom lens.

In a first aspect of the present invention, the zoom lens meets requirements as defined in the following conditional expression (2):

$$0.5 \leq f1/\sqrt{(fw \times fT)} \leq 1.3 \quad (2)$$

where fw is a focal length of the zoom lens taking a wide-angle position, fT is a focal length of the zoom lens taking a telephoto position, and f1 is a focal length of the first lens group.

Preferably, the zoom lens in the first aspect of the invention meets requirements as defined in the following conditional expression (2'):

$$0.6 \leq f1/\sqrt{(fw \times fT)} \leq 1.2 \quad (2')$$

More preferably, the zoom lens in the first aspect of the invention meets requirements as defined in the following conditional expression (2"):

$$0.7 \leq f1/\sqrt{(fw \times fT)} \leq 1.1 \quad (2'')$$

In the zoom lens in the first aspect of the present invention, the fifth lens group and/or, if any, the rearmost lens group(s) behind the fifth lens group may be of negative refractive power.

The zoom lens in the first aspect of the present invention may have the second lens group held in a fixed position while the zoom lens as a whole is being displaced from the wide-angle position to the telephoto position to vary magnification.

In the zoom lens in the first aspect of the present invention, the first lens group may comprise one or more lens pieces that meet a requirement as defined in the following conditional expression (3):

$$0.018 \leq \Delta PgF \quad (3)$$

where PgF is the partial dispersion for glass for the respective wavelengths 435.8 nm, 486.1 nm, and 656.3 nm of spectral lines g, F, and C, given by the equation $$PgF=(ng-nF)/(nF-nC),$$

where ng, nF, and nC are the refractive indices for the respective wavelengths 435.8 nm, and 486.1 nm, and 656.3 nm of spectral lines g, F, and C, and ΔPgF is a deviation from a straight line defined by a first point having as its x, y coordinates the Abbe constant on the d-line vd=60.49 and the partial dispersion PgF=0.5398 for a glass type C7 and a second point having as its x, y coordinates the Abbe constant on the d-line vd=36.30 and the partial dispersion PgF=0.5393 for a glass type F2, where the Abbe constant on the d-line vd is given by the following equation:

$$vd=(nd-1)/(nF-nC),$$

where nd is the refractive index for the wavelength 589.6 nm of spectral line d.

The zoom lens in the first aspect of the present invention meets requirements as defined in the following conditional expression (4):

$$0.60 \leq Lt/fT \leq 0.75 \quad (4)$$

where Lt is an entire length of the optical system of the zoom lens taking a telephoto position, and fT is a focal length of the same of the zoom lens at the telephoto end.

In the zoom lens in the first aspect of the present invention, the fifth lens group and/or, if any, the rearmost lens group(s) behind the fifth lens group may be displaced during varying magnification.

The zoom lens in the first aspect of the present invention may comprise an aperture stop closer to the imaging plane than the second lens group, and all or part of the lens groups closer to the imaging plane than the aperture stop are displaced along the optical axis to shift a focal point from the point at infinity to an object at the near point.

The zoom lens in the first aspect of the invention may have one or more of the lens groups closer to the imaging plane than the fifth lens group displaced toward the object during shifting from the wide-angle position to the telephoto position to vary magnification.

The combined lateral magnification of one or more of the lens groups closer to the imaging plane than the fifth lens group can be increased by displacing it or them during shifting from the wide-angle position to the telephoto end to vary magnification.

When an actual value of @bt is smaller than the lower limit defined in the conditional expression (1), the fifth lens group and, if any, the rearmost lens group(s) behind the fifth lens group attain a reduced effect of raising the magnification, and resultantly, the zoom lens has to have the increased entire length at the telephoto end. Accordingly, this brings about an increase in a displacement of the first lens group for varying magnification, which necessitates a more complicated cam mechanism for displacing the first lens group, and resultantly, hinders downsizing the lens barrel as a whole.

When the actual value of @bt exceeds the upper limit defined in the conditional expression (1), the fifth lens group and, if any, the rearmost lens group(s) behind the fifth lens group attain an excessive effect of raising the magnification, which results in a smaller number of the lens pieces encountering a difficulty in compensating for aberrations.

The zoom lens satisfying the conditions defined in the conditional expression (1) can have the reduced entire length at the telephoto end, which is useful to reduce the displacement of the first lens group for varying magnification, and can permit the reduced number of the lens pieces to satisfactorily compensate for aberrations. Thus, fulfilling the conditions in the conditional expression (1) enables the resultant zoom lens to simultaneously attain downsizing the lens barrel as a whole and improving its performance.

When an actual value $f1/\sqrt{(fw \cdot fT)}$ is smaller than the lower limit defined in the conditional expression (2) and the first lens group has its positive refractive power intensified, the zoom lens develops chromatic aberration more greatly at the telephoto end to such an undesired extent that it is hard to compensate for the chromatic aberration. When the actual value $f1/\sqrt{(fw \cdot fT)}$ exceeds the upper limit defined in the conditional expression (2) and the first lens group has its positive refractive power weakened, a flux of beams incident upon the second lens group unsatisfactorily converges, which results in the second lens group being larger in dimensions and necessitate a greater displacement of the first lens group to such an undesired extent that it is unavoidable for the lens barrel as a whole to be larger in dimensions.

Fulfilling the condition of abnormal dispersion of the lens pieces in the first lens group as defined in the conditional expression (3) enables the zoom lens at the telephoto end to satisfactorily compensate for longitudinal chromatic aberration.

Fulfilling the conditions of the entire length of the optical system of the zoom lens at the telephoto end as defined in the conditional expression (4) makes it possible to attain a telephotographing zoom lens that, especially taking a telephoto position, has its optical system considerably reduced in entire length. When an actual value of Lt/fT is smaller than the lower limit defined in the conditional expression (4), the zoom lens at the telephoto end has its optical system excessively reduced in entire length, and the zoom lens, especially taking a wide-angle position, fails to ensure the desired optical performance.

When the actual value of Lt/fT exceeds the upper limit as defined in the conditional expression (4), the resultant telephotographing zoom lens at the telephoto end has its optical system increased in entire length, which hinders downsizing the lens barrel as a whole.

Meeting the requirements defined in the conditional expression (4) enables the resultant optical system to implement an enhanced imaging performance and the lens barrel as a whole to be downsized.

BEST MODE OF THE INVENTION

Embodiment 1

Figure 1:
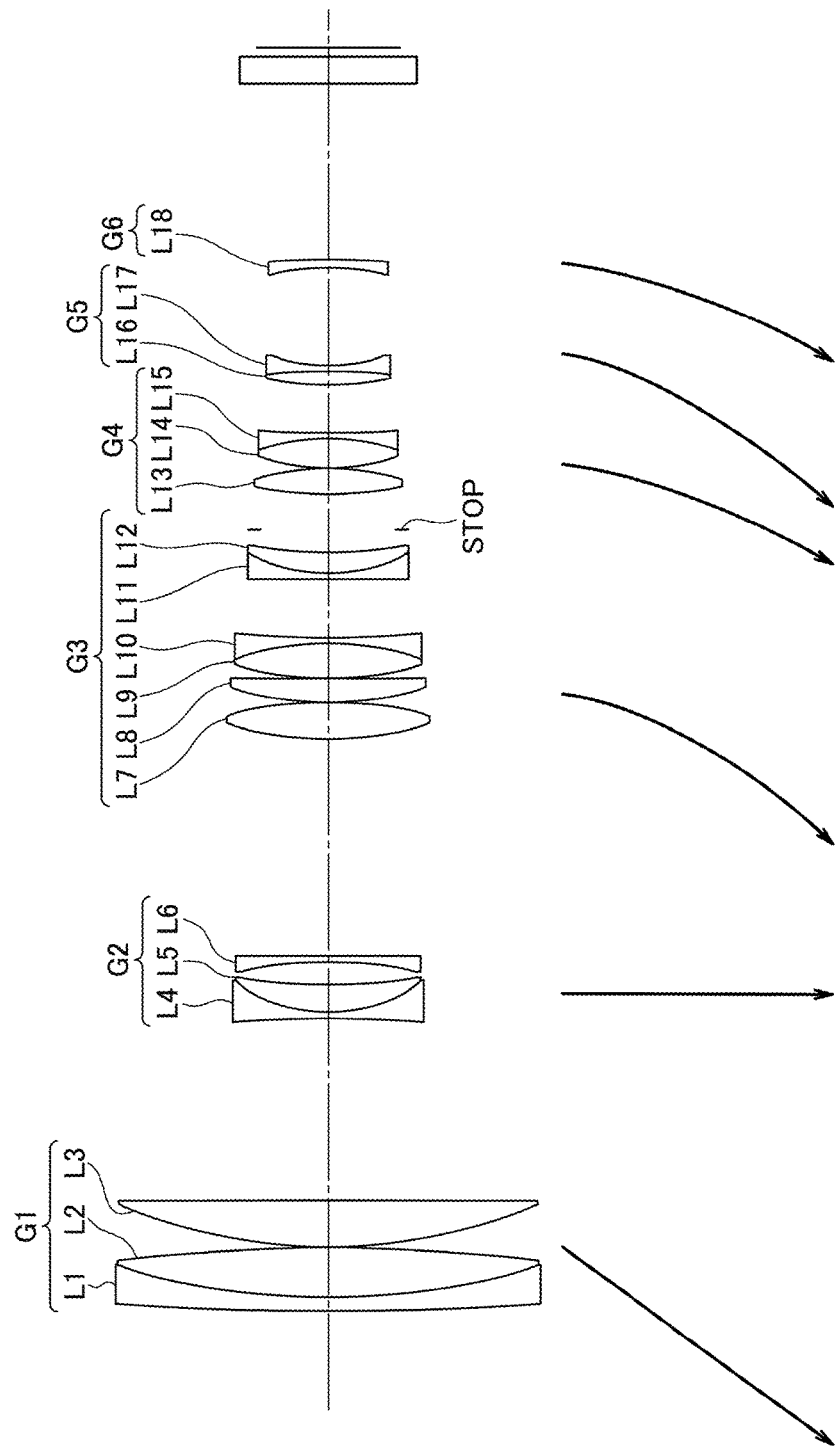
FIG. 1 is a vertical sectional view showing a lens arrangement in a first embodiment of a zoom lens according to the present invention when the zoom lens is taking a wide-angle position.
Figure 2:
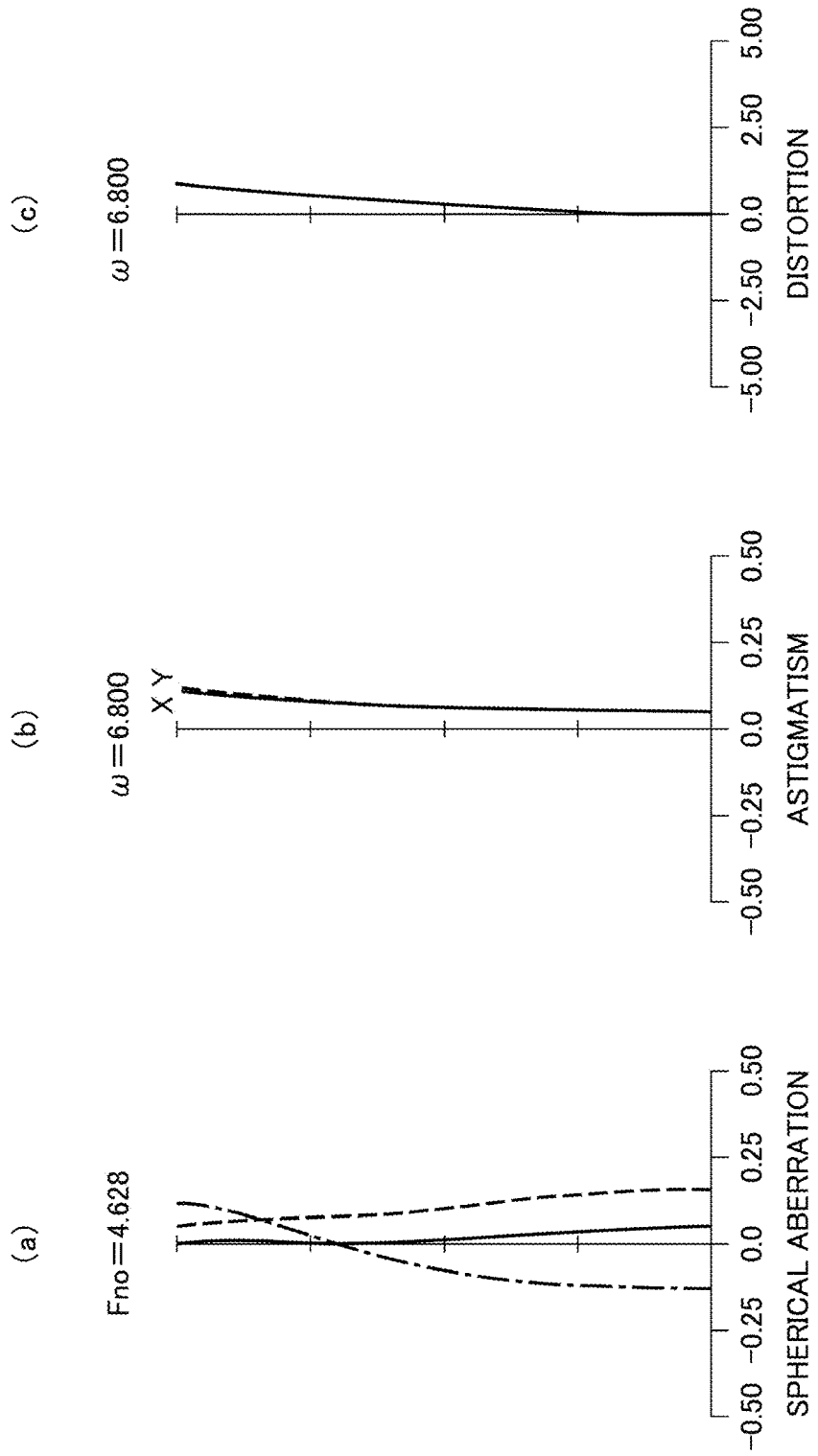
FIG. 2 depicts graphs of spherical aberration, astigmatism, and distortion aberration developed in the first embodiment of the zoom lens when the zoom lens taking a wide-angle position is in focus on the point at infinity, the graphs of spherical aberration showing a rate of a stop setting F-number to the full diaphragm stop setting F-number on the vertical axis and a degree of defocusing on the horizontal axis for the d-line (wavelength 587.6 nm) expressed by solid line, the c-line (wavelength 656.3 nm) by broken line, and the g-line (wavelength 435.8 nm) by alternate long and short dash line, the graphs of astigmatism showing an image height on the vertical axis and a degree of defocusing on the horizontal axis for a sagittal imaging plane expressed by solid line and a meridional imaging plane by broken line, and the graphs of distortion aberration show an image height on the vertical axis and a degree of distortion in percentage.
Figure 3:
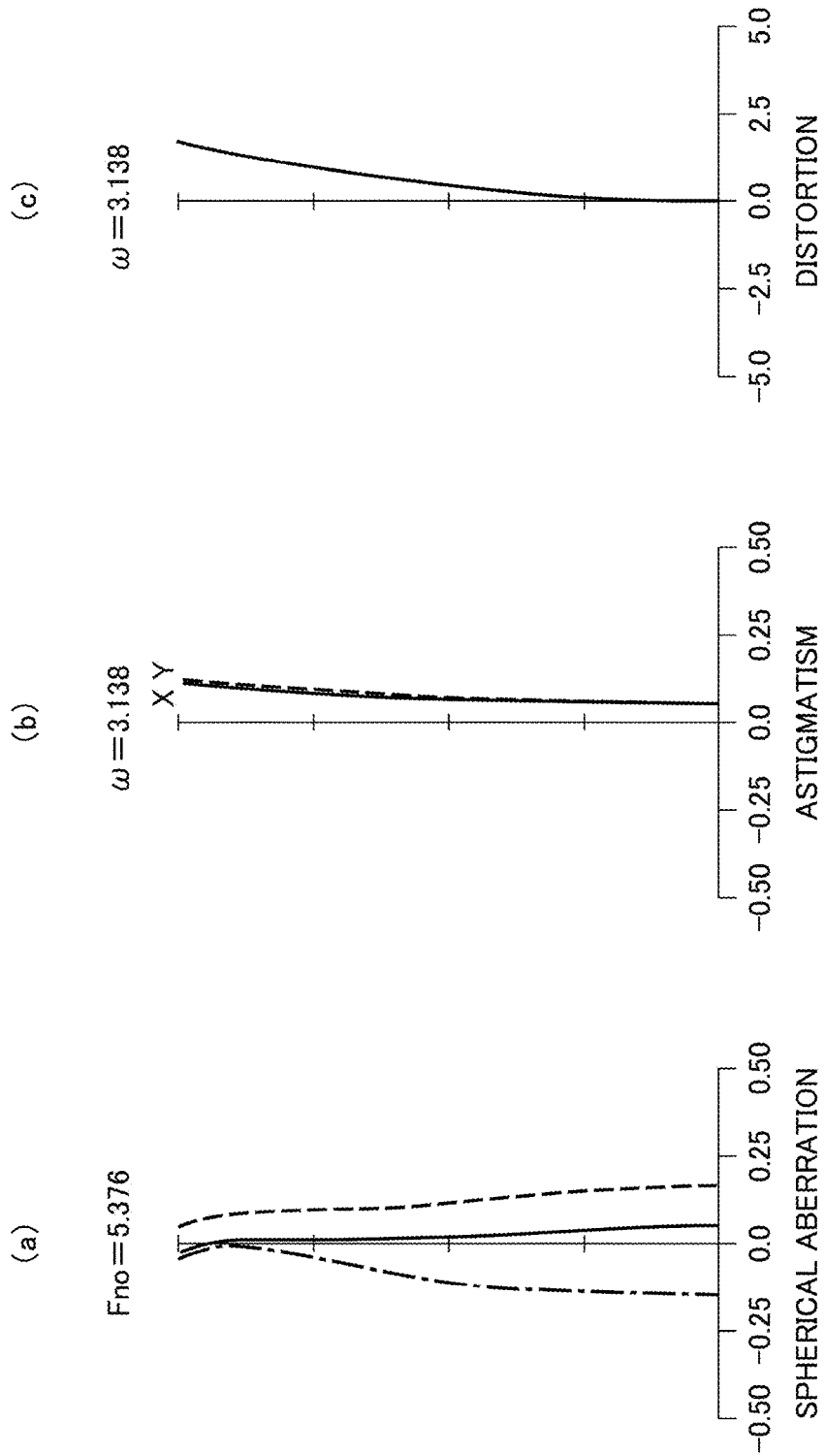
FIG. 3 depicts graphs of spherical aberration, astigmatism, and distortion aberration developed in the first embodiment of the zoom lens when the zoom lens taking an intermediate zooming range position is in focus on the point at infinity.
Figure 4:
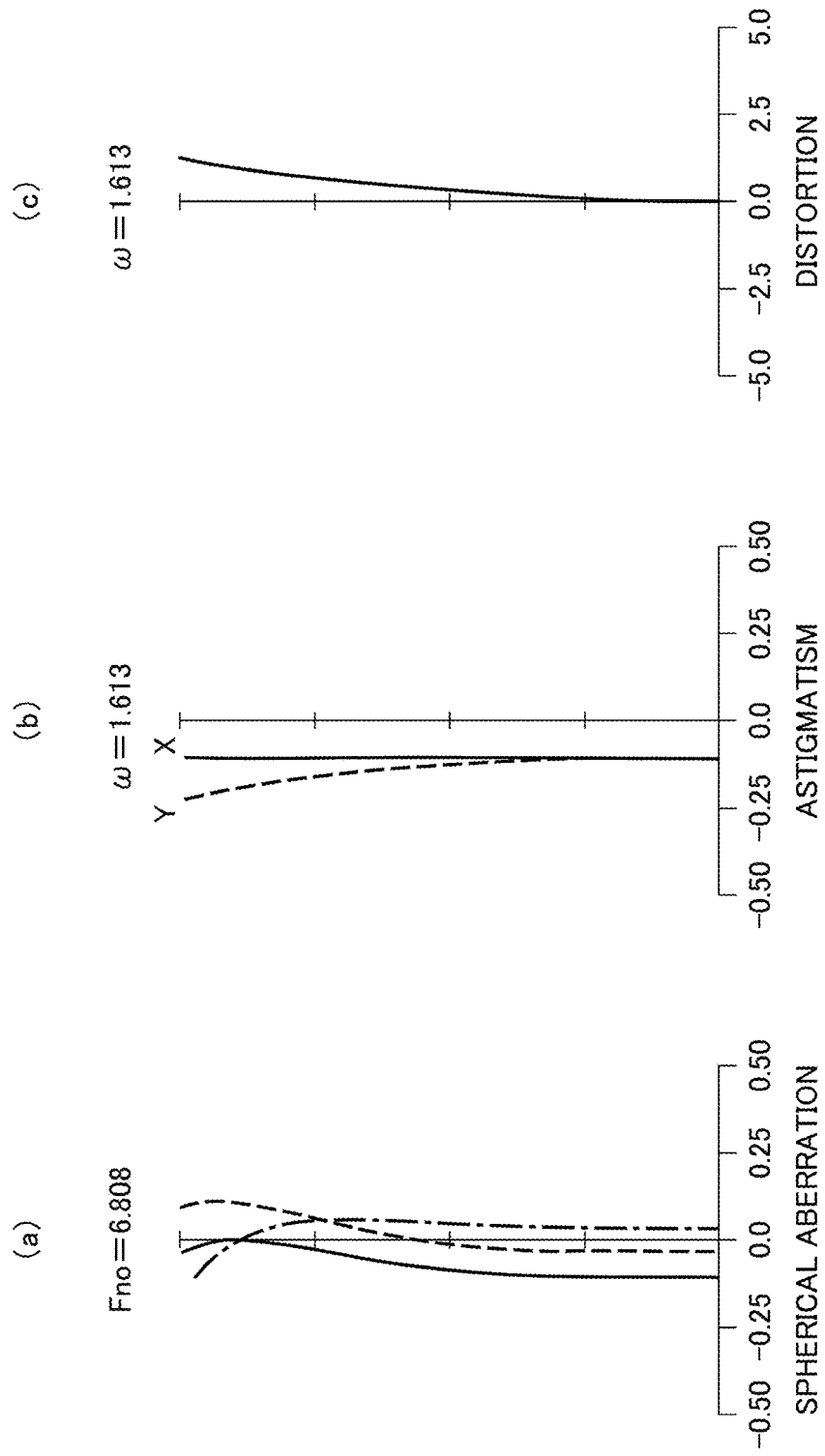
FIG. 4 depicts graphs of spherical aberration, astigmatism, and distortion aberration developed in the first embodiment of the zoom lens when the zoom lens taking a telephoto position is in focus on the point at infinity.

FIG. 1 is a vertical sectional view showing a lens arrangement of a first embodiment of a zoom lens according to the present invention. The first embodiment of the zoom lens comprises the foremost or first lens group G1 of positive refractive power located the closest to an object, the succeeding second lens group G2 of negative refractive power, the third lens group G3 of positive refractive power, the fourth lens group G4 of positive refractive power, the fifth lens group G5 of negative refractive power, and the rearmost or sixth lens group G6 of negative refractive power arranged in this order.

The first lens group G1 comprises a duplet of a meniscus lens piece L1 of negative refractive power with its convex surface oriented to the object and a lens piece L2 of positive refractive power cemented with the meniscus lens piece L1, and a lens piece L3 of positive refractive power, all the lens pieces being arranged in this order from the closest to the object in the foremost position to the farthest in the rearmost position.

The second lens group G2 comprises a duplet of a lens piece L4 of negative refractive power with its concave surface oriented toward the object and a meniscus lens piece L5 of positive refractive power cemented with the lens piece L4, and a meniscus lens piece L6 of negative refractive power with its concave surface oriented toward the object.

The third lens group G3 comprises a biconvex lens piece L7, a biconvex lens piece L8, a duplet of a lens piece L9 of positive refractive power with its convex surface oriented toward the object and a lens piece L10 of negative refractive power cemented with the lens piece L9, and another duplet of a biconcave lens piece L11 and a meniscus lens piece L12 of positive refractive power with its convex surface oriented toward the object, all the lens pieces arranged in this order from the closest to the object in the foremost position to the farthest in the rearmost position.

The fourth lens group G4 comprises a biconvex lens piece L13, and a duplet of a lens piece L14 of positive refractive power with its convex surface oriented toward the object and a lens piece L15 of positive refractive power cemented with the lens piece L14, all the lens pieces being arranged in this order from the closest to the object in the foremost position to the farthest from the object in the rearmost position.

The fifth lens group G5 comprises a duplet of a biconvex lens piece L16 positioned closer to the object and a biconcave lens piece L17 cemented with the biconvex lens piece L16.

The sixth lens group G6 comprises a meniscus lens piece L18 of negative refractive power with its concave surface oriented toward the object.

During varying magnification from the wide-angle and to the telephoto end, the first embodiment of the zoom lens has its first lens group moved toward the object, its second lens group held in a fixed position, its third lens group moved on a trajectory that draws an arc toward the imaging plane relative to the second lens group, its fourth lens group moved on a trajectory that draws an arc toward the imaging plane relative to the third lens group, its fifth lens group moved toward the object, and its sixth lens group moved in the same manner as the fourth lens group.

Focusing on an object at the near point is carried out by moving the fifth lens group toward the imaging plane. For that purpose, the duplet of the lens pieces L11 and L12 cemented together is moved in vertical directions normal to the optical axis so as to correct fuzziness of an image during photographing.

Optical data of the lens pieces in the first embodiment of the zoom lens are provided in Table 1. Surface number NS designates the n-th lens surface of the optical system where all the component lens pieces are arranged in order on the closest-to-the-object-first basis, R is a radius of curvature of the n-th lens surface, D is a distance along the optical axis between a pair of the adjacent lens surfaces, Nd is a refractive index for the d-line (wavelength λ=587.6 nm), and vd is an Abbe number for the d-line (wavelength λ=587.6 nm).

TABLE 1

| NS | R | D | Nd | vd | ΔPgF |
|---|---|---|---|---|---|
| 1 | 486.4782 | 1.4500 | 1.83400 | 37.34 | |
| 2 | 83.3399 | 0.0100 | 1.56732 | 42.84 | |
| 3 | 83.3399 | 5.5100 | 1.49700 | 81.61 | 0.0375 |
| 4 | −172.8214 | 0.1500 | | | |
| 5 | 63.2093 | 5.2914 | 1.48749 | 70.44 | |
| 6 | −895.6302 | D(6) | | | |
| 7 | 0.0000 | 1.8876 | | | |
| 8 | −96.2544 | 0.7500 | 1.76524 | 50.37 | |
| 9 | 18.4045 | 0.0100 | 1.56732 | 42.84 | |
| 10 | 18.4045 | 3.0631 | 1.80518 | 25.46 | |
| 11 | 70.9807 | 2.5194 | | | |
| 12 | −41.5515 | 0.7000 | 1.80420 | 46.50 | |
| 13 | −10114.4818 | D(13) | | | |
| 14 | 39.2470 | 4.1119 | 1.49700 | 81.61 | |
| 15 | −41.3613 | 0.1000 | | | |
| 16 | 40.1380 | 2.6375 | 1.48749 | 70.44 | |
| 17 | −1692.6300 | 0.1000 | | | |
| 18 | 43.0535 | 3.8276 | 1.48749 | 70.44 | |
| 19 | −29.6342 | 0.0100 | 1.56732 | 42.84 | |
| 20 | −29.6342 | 0.7000 | 1.90739 | 33.25 | |
| 21 | 119.5406 | 6.7000 | | | |
| 22 | −1390.5046 | 0.6000 | 1.77791 | 44.07 | |
| 23 | 18.4637 | 0.0100 | 1.56732 | 42.84 | |
| 24 | 18.4637 | 2.3536 | 1.90366 | 31.31 | |
| 25 | 48.8224 | 2.3000 | | | |
| 26 STOP | 0.0000 | D(26) | | | |
| 27 | 52.7369 | 2.8298 | 1.56732 | 42.84 | |
| 28 | −27.8361 | 0.1000 | | | |
| 29 | 26.5392 | 3.2246 | 1.54356 | 46.62 | |
| 30 | −23.1396 | 0.0100 | 1.56732 | 42.84 | |

TABLE 1-continued

| NS | R | D | Nd | vd | ΔPgF |
|----|---|---|----|----|----|
| 31 | −23.1396 | 0.6000 | 1.90366 | 31.31 | |
| 32 | 104.0723 | D(32) | | | |
| 33 | 54.2263 | 1.4342 | 1.80518 | 25.46 | |
| 34 | −61.6536 | 0.0100 | 1.56732 | 42.84 | |
| 35 | −61.6536 | 0.5600 | 1.74161 | 49.80 | |
| 36 | 16.9498 | D(36) | | | |
| 37 | −24.4610 | 0.9300 | 1.48749 | 70.44 | |
| 38 | −87.3035 | 0.0000 | | | |
| 39 | 0.0000 | D(39) | | | |
| 40 | 0.0000 | 2.8000 | 1.51680 | 64.20 | |
| 41 | 0.0000 | 1.0000 | | | |

Distances between the adjacent lens surfaces in several pairs in the first embodiment of the zoom lens are given in Table 2 below as well as varied values of the focal distance f, the F-number Fno, and the field angle ω for each of the zooming settings at the wide-angle position (f=68.7634), at the intermediate zooming range (f=149.5669), and at the telephoto position (f=291.2580), respectively.

TABLE 2

| f | 68.7634 | 149.5669 | 291.2580 |
|---|---------|----------|----------|
| Fno | 4.62776 | 5.18280 | 6.80830 |
| ω | 6.8004 | 3.13810 | 1.61270 |
| D(6) | 18.4552 | 49.5086 | 57.3552 |
| D(13) | 24.5140 | 18.2970 | 1.5000 |
| D(26) | 4.3452 | 4.2773 | 7.7592 |
| D(32) | 5.4806 | 1.4000 | 2.7630 |
| D(36) | 11.0774 | 15.1581 | 13.7950 |
| D(39) | 19.7269 | 26.0118 | 39.3269 |

Distances between the adjacent lens surfaces in several pairs in the first embodiment of the zoom lens during focusing on an object at the near point for zooming settings at the wide-angle position (f=68.7634), at the intermediate zooming range (f=149.5669), and at the telephoto position (f=291.2580), respectively, are given in Table 3 below as well as varied values of the focal length f upon focusing on an object at infinite distance away and the distance D(0) from the front surface of the first lens piece to the object.

TABLE 3

| f | 68.7634 | 149.5669 | 291.2580 |
|---|---------|----------|----------|
| D(0) | 1058.11 | 1027.06 | 1019.21 |
| D(32) | 6.6285 | 4.8033 | 12.0080 |
| D(36) | 9.9260 | 11.7548 | 4.5501 |

Embodiment 2

Figure 5:
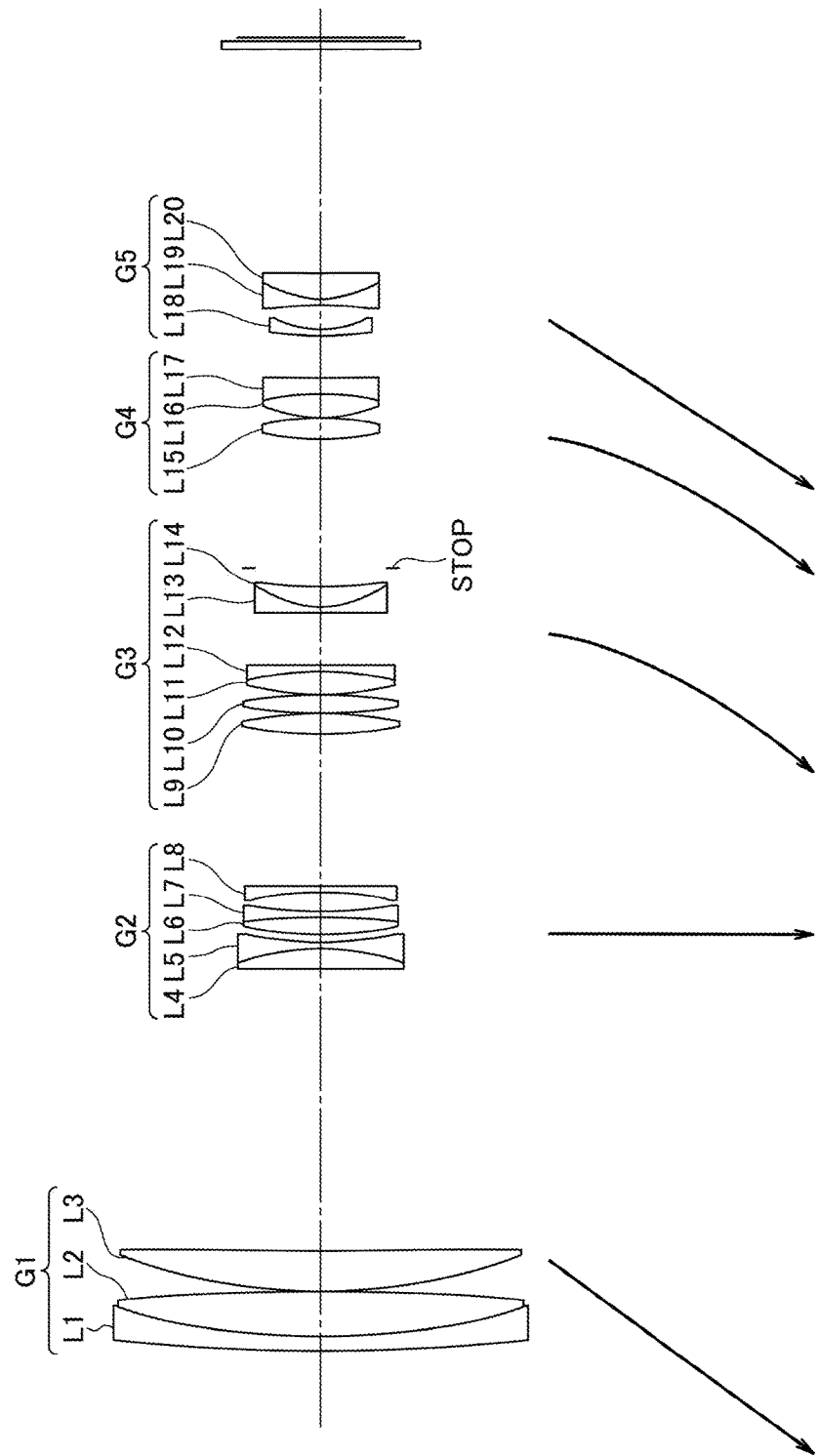
FIG. 5 is a vertical sectional view showing a lens arrangement in a second embodiment of the zoom lens according to the present invention when the zoom lens is taking a wide-angle position.
Figure 6:
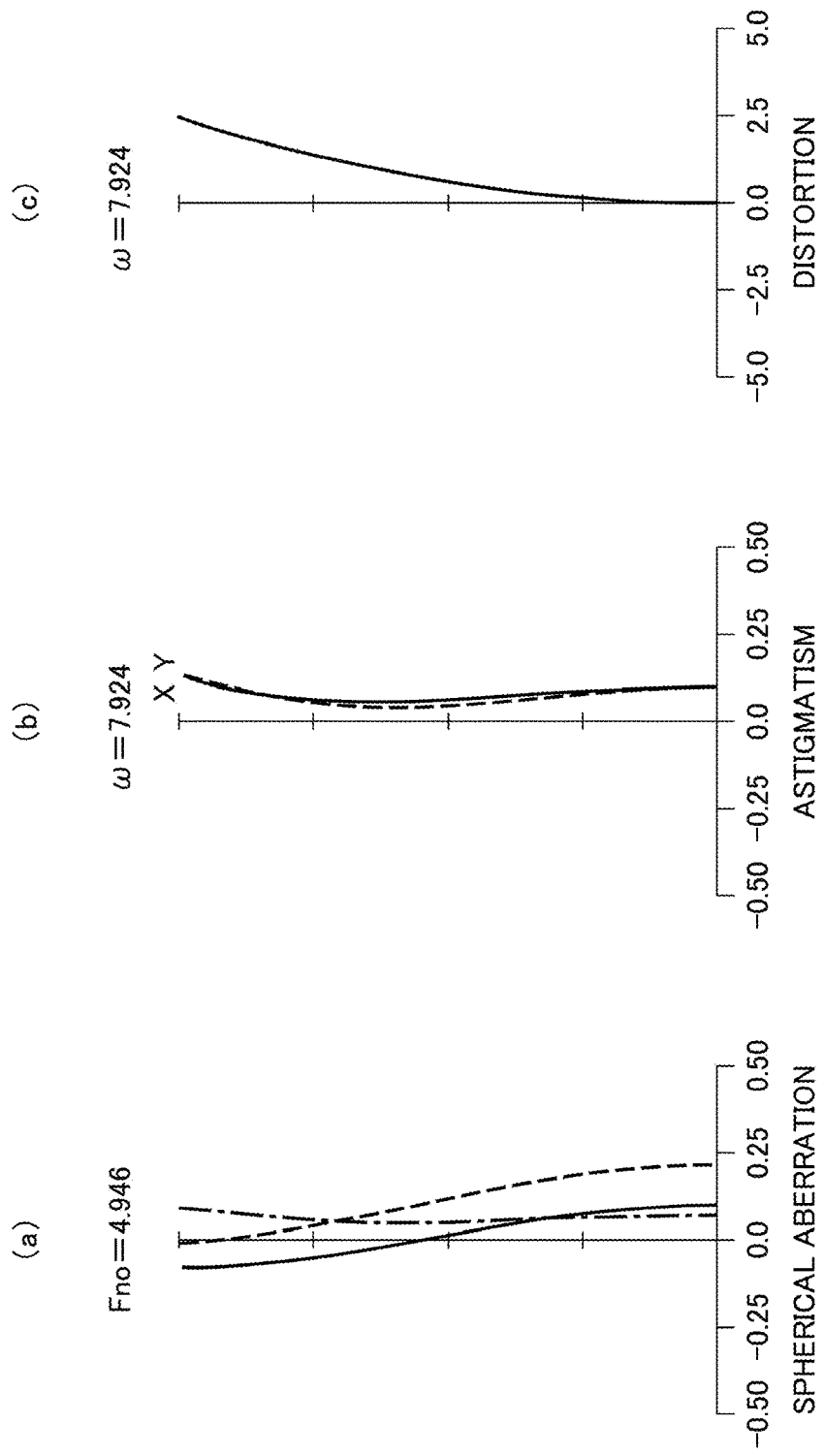
FIG. 6 depicts graphs of spherical aberration, astigmatism, and distortion aberration developed in the second embodiment of the zoom lens when the zoom lens taking a wide-angle position is in focus on the point at infinity.
Figure 7:
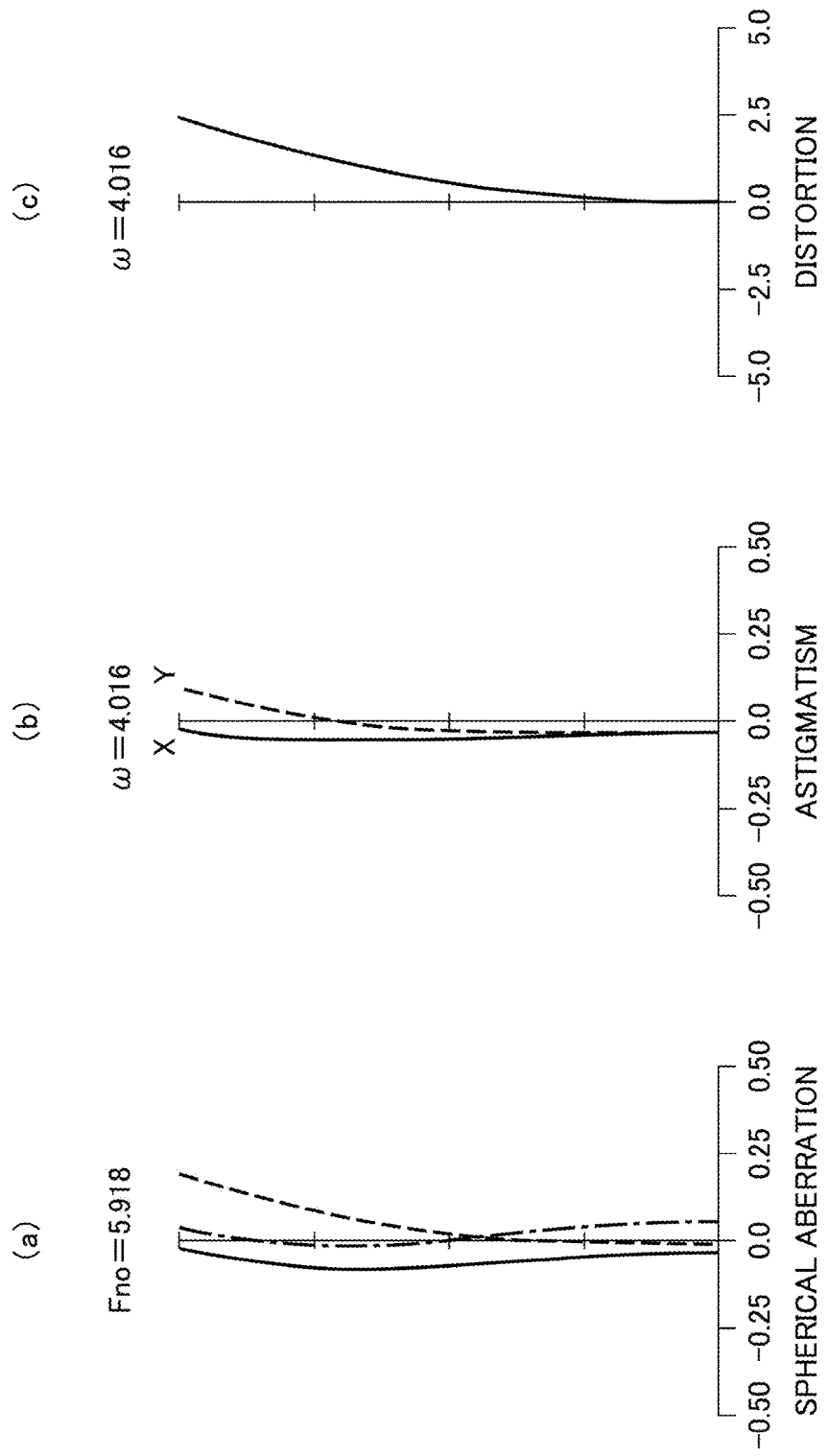
FIG. 7 depicts graphs of spherical aberration, astigmatism, and distortion aberration developed in the second embodiment of the zoom lens when the zoom lens taking an intermediate zooming range position is in focus on the point at infinity.
Figure 8:
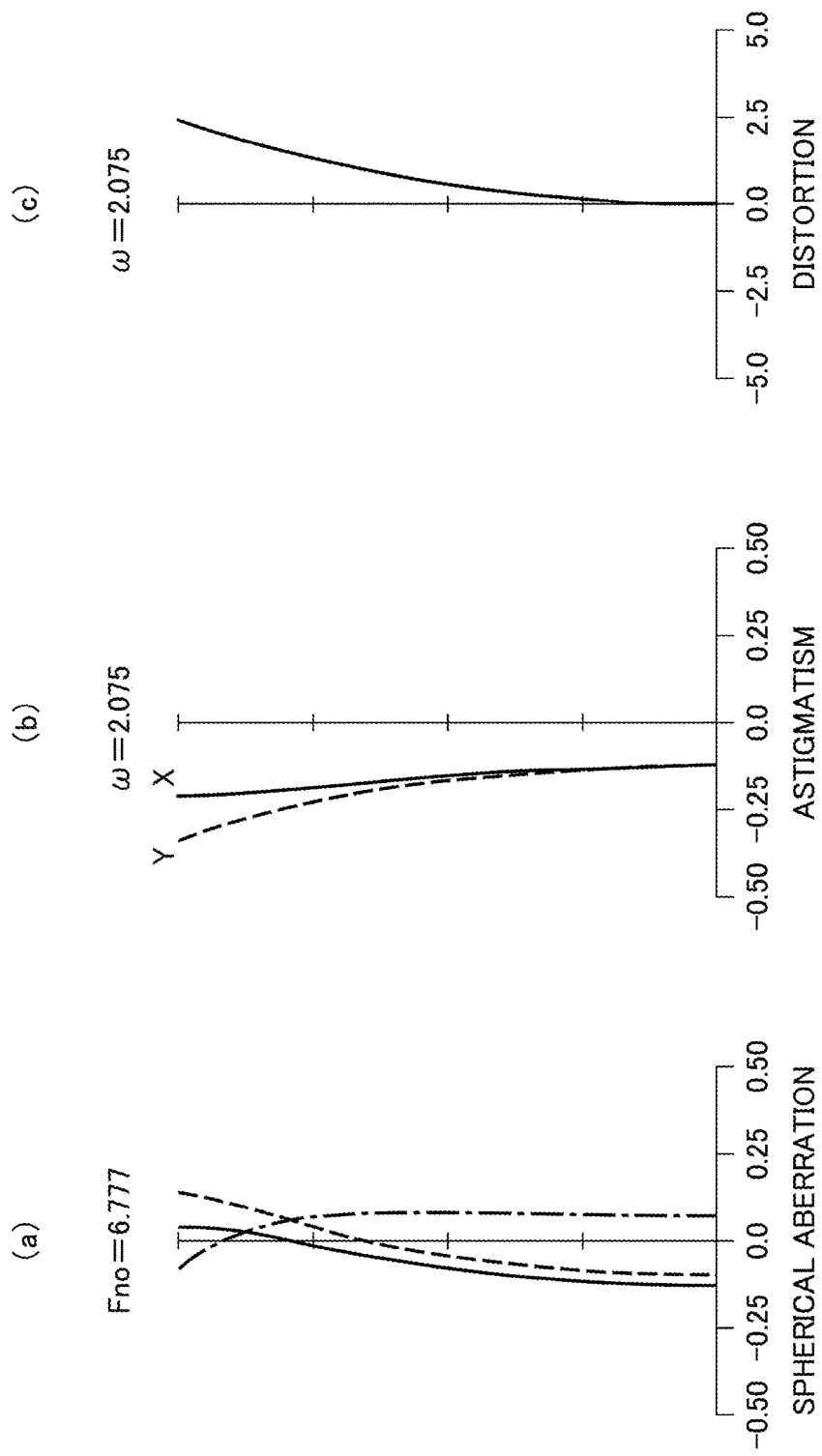
FIG. 8 depicts graphs of spherical aberration, astigmatism, and distortion aberration developed in the second embodiment of the zoom lens when the zoom lens taking a telephoto position is in focus on the point at infinity.

FIG. 5 is a vertical sectional view showing a lens arrangement of a second embodiment of the zoom lens according to the present invention. The second embodiment of the zoom lens comprises the foremost or first lens group G1 of positive refractive power located the closest to an object, the succeeding second lens group G2 of negative refractive power, the third lens group G3 of positive refractive power, the fourth lens group G4 of positive refractive power, and the fifth lens group G5 of negative refractive power, all the lens groups being arranged in this order.

The first lens group G1 comprises a duplet of a meniscus lens piece L1 of negative refractive power with its convex surface oriented to the object and a lens piece L2 of positive refractive power cemented with the meniscus lens piece L1, and a meniscus lens piece L3 of positive refractive power with its convex surface oriented to the object, all the lens pieces being arranged in this order from the closest to the object in the foremost position to the farthest in the rearmost position.

The second lens group G2 comprises a duplet of a lens piece L4 of positive refractive power and a lens piece L5 of negative refractive power cemented with the lens piece L4, another duplet of a lens piece L6 of positive refractive power with its convex surface oriented toward the object and a lens piece L7 of negative refractive power cemented with the lens piece L6, and a meniscus lens piece L8 of negative refractive power with its concave surface oriented to the object, all the lens pieces being arranged in this order from the closest to the object in the foremost position to the farthest in the rearmost position.

The third lens group G3 comprises a biconvex lens piece L9, a biconvex lens piece L10, a duplet of a lens piece L11 of positive refractive power with its convex surface oriented to the object and a lens piece L12 of negative refractive power cemented with the lens piece L11, and another duplet of a biconcave lens piece L13 and a meniscus lens piece L14 of positive refractive power with its convex surface oriented to the object, and cemented with the biconcave lens piece L13, all the lens pieces being arranged in this order from the closest to the object in the foremost position to the farthest in the rearmost position.

The fourth lens group G4 comprises a biconvex lens piece L15, and a duplet of a lens piece L16 of positive refractive power with its convex surface oriented toward the object and a lens piece L17 of negative refractive power cemented with the lens piece L16, all the lens pieces being arranged in this order from the closest to the object in the foremost position to the farthest from the object in the rearmost position.

The fifth lens group G5 comprises a lens piece L18 of negative refractive power with its convex surface oriented toward the object, and a duplet of a biconcave lens piece L19 and a lens piece L20 of positive refractive power cemented with the lens piece L19, all the lens pieces being arranged in this order from the closest to the object in the foremost position to the farthest in the rearmost position.

During varying magnification from the wide-angle and to the telephoto end, the second embodiment of the zoom lens has its first lens group moved toward the object, its second lens group held in a fixed position, its third lens group moved on a trajectory that draws an arc toward the imaging plane relative to the second lens group, its fourth lens group moved on a trajectory that draws an arc toward the imaging plane relative to the third lens group, and its fifth lens group moved toward the object.

For focusing on an object at the near point, the fourth lens group is moved toward the imaging plane. The duplet of the cemented lens pieces L13 and L14 are moved in directions normal to the optical axis so as to correct fuzziness of an image during photographing.

Optical data of the second embodiment of the zoom lens are provided in Table 4.

TABLE 4

| NS | R | D | Nd | vd | ΔPgF |
|----|---|---|----|----|----|
| 1 | 507.2915 | 3.0000 | 1.83400 | 37.34 | |
| 2 | 170.5651 | 0.0200 | 1.56732 | 42.84 | |
| 3 | 170.5651 | 10.0500 | 1.49700 | 81.61 | 0.0375 |
| 4 | −546.9417 | 0.3000 | | | |
| 5 | 140.0409 | 9.1000 | 1.49700 | 81.61 | 0.0375 |
| 6 | 6747.4128 | D(6) | | | |
| 7 | −462.7175 | 4.4000 | 1.80518 | 25.46 | |

TABLE 4-continued

| NS | R | D | Nd | vd | ΔPgF |
|---|---|---|---|---|---|
| 8 | −59.7377 | 0.0100 | 1.56732 | 42.84 | |
| 9 | −59.7377 | 1.6000 | 1.75540 | 47.52 | |
| 10 | 89.4635 | 1.7000 | | | |
| 11 | 84.1934 | 4.0322 | 1.80518 | 25.46 | |
| 12 | −143.0460 | 0.0100 | 1.56732 | 42.84 | |
| 13 | −143.0460 | 1.4000 | 1.83481 | 42.72 | |
| 14 | 103.1048 | 4.3467 | | | |
| 15 | −72.3495 | 1.5000 | 1.90366 | 31.31 | |
| 16 | −959.3316 | D(16) | | | |
| 17 | 96.4840 | 4.8156 | 1.49700 | 81.61 | |
| 18 | −93.3616 | 0.2000 | | | |
| 19 | 136.2135 | 3.8473 | 1.48749 | 70.44 | |
| 20 | −135.3488 | 0.2000 | | | |
| 21 | 74.9337 | 5.3536 | 1.48749 | 70.44 | |
| 22 | −69.9732 | 0.0100 | 1.56732 | 42.84 | |
| 23 | −69.9732 | 1.5000 | 1.90366 | 31.31 | |
| 24 | −1625.6271 | 12.0000 | | | |
| 25 | −276.9348 | 1.2000 | 1.80393 | 37.39 | |
| 26 | 24.9138 | 0.0100 | 1.56732 | 42.84 | |
| 27 | 24.9138 | 4.7931 | 1.83950 | 29.48 | |
| 28 | 112.4209 | 4.5000 | | | |
| 29 STOP | 0.0000 | D(29) | | | |
| 30 | 82.8644 | 4.6000 | 1.50601 | 60.25 | |
| 31 | −68.5146 | 0.2000 | | | |
| 32 | 38.3468 | 5.4000 | 1.50163 | 62.32 | |
| 33 | −58.6905 | 0.0100 | 1.56732 | 42.84 | |
| 34 | −58.6905 | 3.3708 | 1.90366 | 31.31 | |
| 35 | 1283.2003 | 0.0000 | | | |
| 36 | 0.0000 | D(36) | | | |
| 37 | 101.8564 | 1.3000 | 1.83481 | 42.72 | |
| 38 | 24.0855 | 5.7488 | | | |
| 39 | −73.4446 | 1.3504 | 1.48749 | 70.44 | |
| 40 | 24.7023 | 0.0100 | 1.56732 | 42.84 | |
| 41 | 24.7023 | 5.6000 | 1.66885 | 31.91 | |
| 42 | −3665.3014 | D(42) | | | |
| 43 | 0.0000 | 2.0000 | 1.51680 | 64.20 | |
| 44 | 0.0000 | 1.0000 | | | |

Distances between the adjacent lens surfaces in several pairs in the second embodiment of the zoom lens are given in Table 5 below as well as varied values of the focal distance f, the F-number Fno, and the field angle ω for each of the photographing positions at the wide-angle position (f=151.9125), at the intermediate zooming range (f=300.56), and at the telephoto position (f=582.2009), respectively.

TABLE 5

| f | 151.9125 | 300.5600 | 582.2009 |
|---|---|---|---|
| Fno | 4.94595 | 5.91814 | 6.77715 |
| ω | 7.9237 | 4.01640 | 2.07480 |
| D(6) | 64.0000 | 111.8284 | 141.2200 |
| D(16) | 34.6165 | 23.4740 | 2.0400 |
| D(29) | 28.9568 | 16.6652 | 23.1985 |
| D(36) | 9.6584 | 5.9504 | 3.1420 |
| D(42) | 51.0000 | 78.1421 | 95.8512 |

Distances between the adjacent lens surfaces in several pairs in the second embodiment of the zoom lens during focusing on an object at the near point for zooming settings at the wide-angle position (f=151.9125), at the intermediate zooming range (f=300.56), and at the telephoto position (f=582.2009), respectively, are given in Table 6 below as well as varied values of the focal length f upon focusing on an object at infinite distance away and the distance D(0) from the front surface of the first lens piece to the object.

TABLE 6

| f | 151.9125 | 300.5600 | 582.2009 |
|---|---|---|---|
| D(0) | 2401.28 | 2353.45 | 2324.06 |

TABLE 6-continued

| D(29) | 27.6147 | 13.4871 | 14.3841 |
|---|---|---|---|
| D(36) | 11.0005 | 9.1285 | 11.9565 |

Embodiment 3

Figure 9:
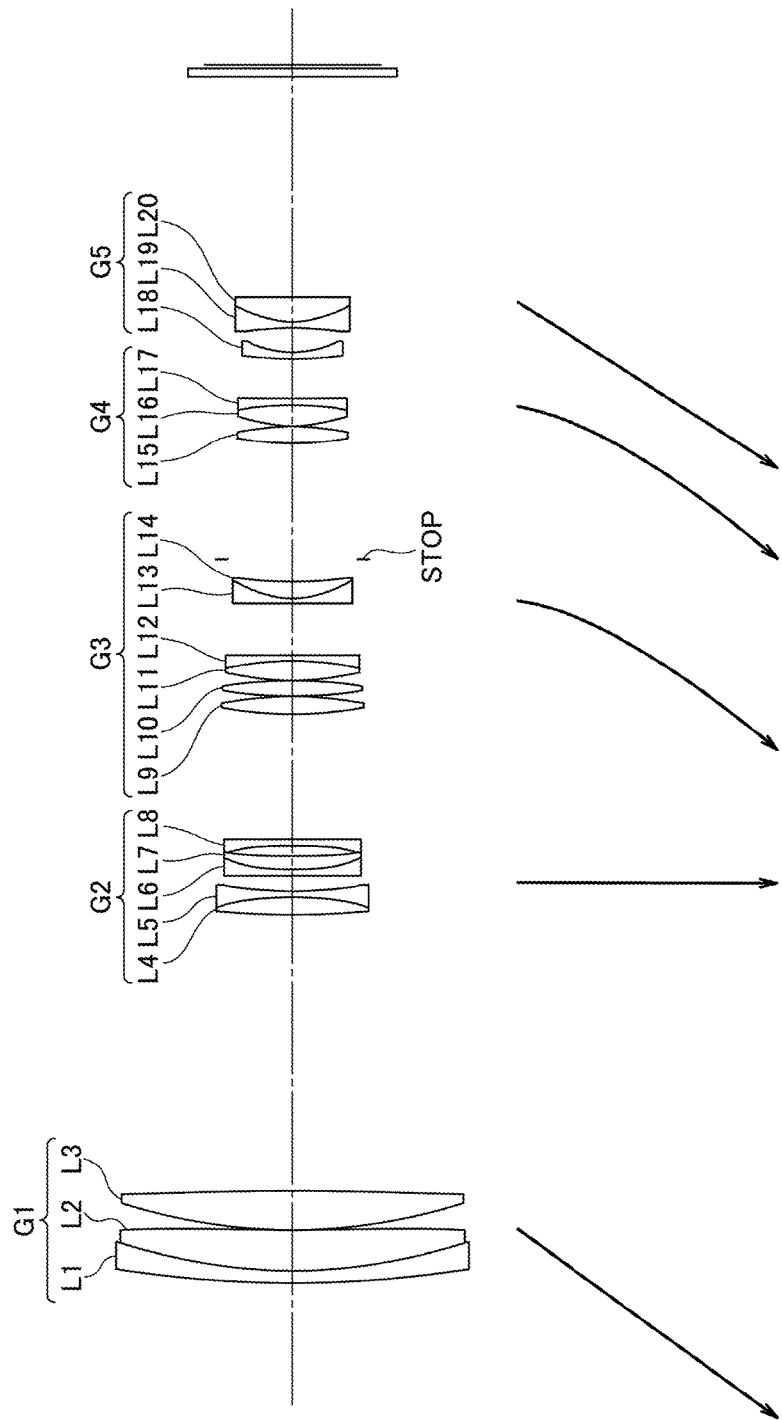
FIG. 9 is a vertical sectional view showing a third embodiment of the zoom lens according to the present invention when the zoom lens is taking a wide-angle position.
Figure 10:
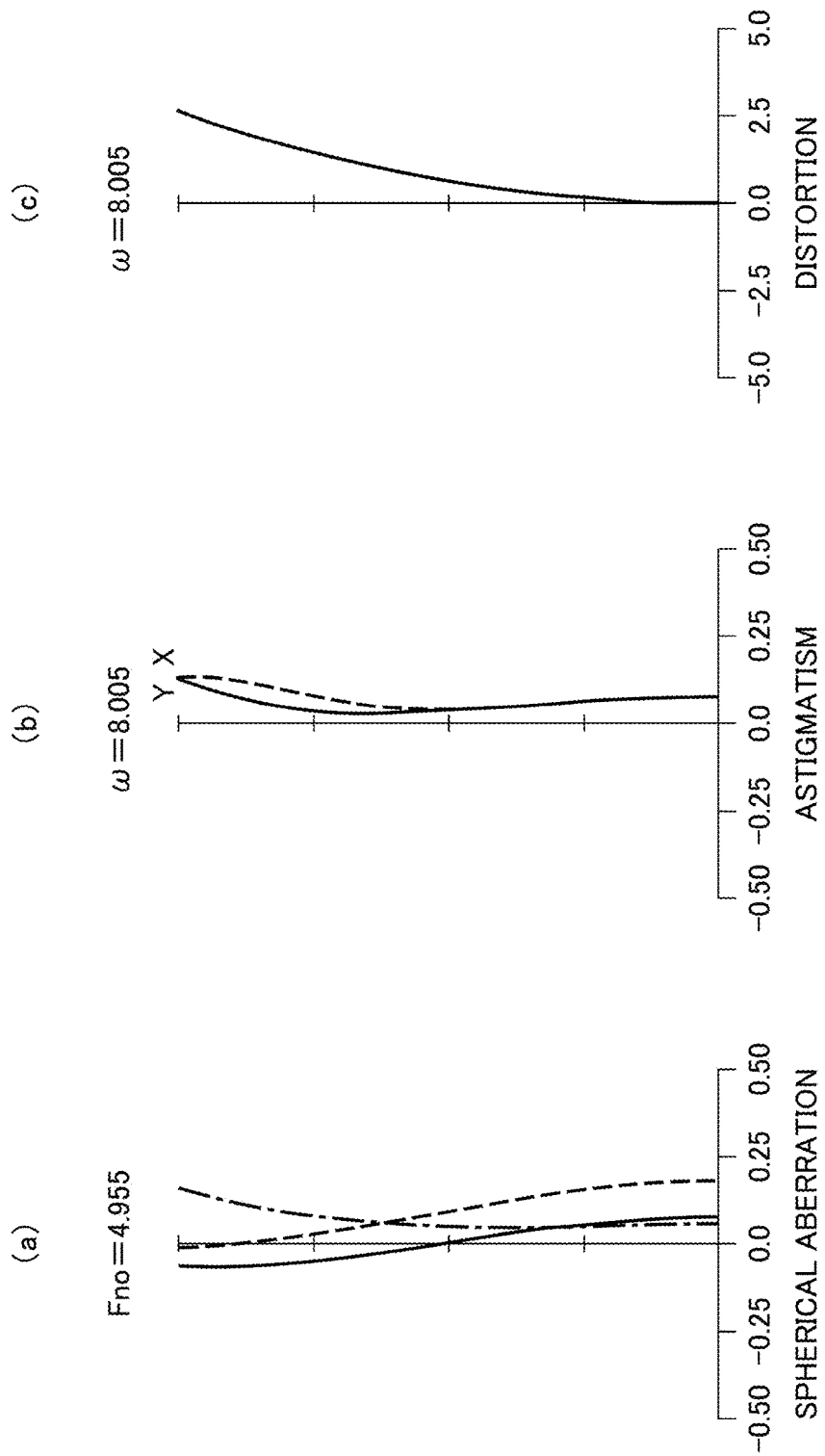
FIG. 10 depicts graphs of spherical aberration, astigmatism, and distortion aberration developed in the third embodiment of the zoom lens when the zoom lens taking a wide-angle position is in focus on the point at infinity.
Figure 11:
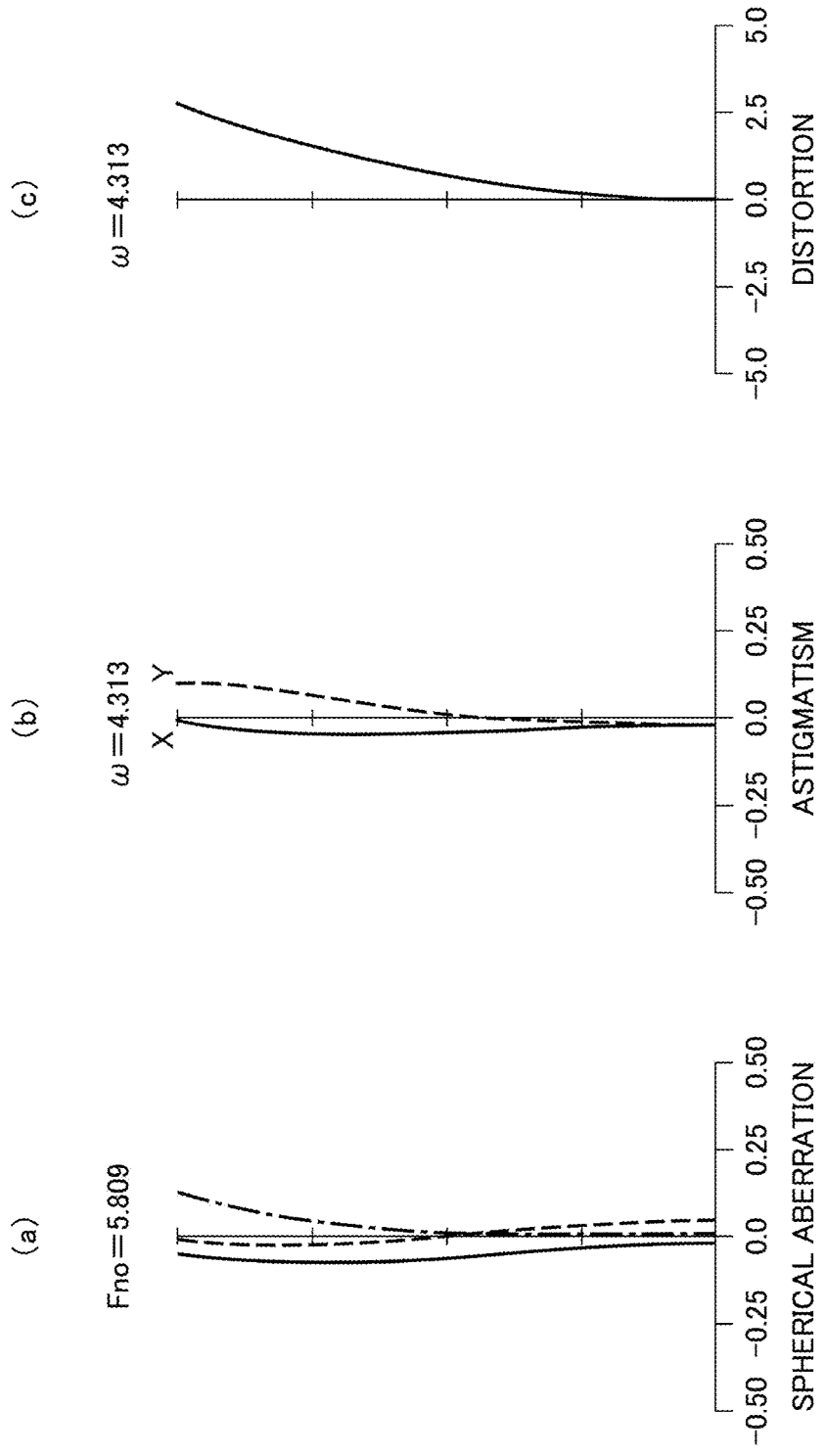
FIG. 11 depicts graphs of spherical aberration, astigmatism, and distortion aberration developed in the third embodiment of the zoom lens when the zoom lens taking an intermediate zooming range position is in focus on the point at infinity.
Figure 12:
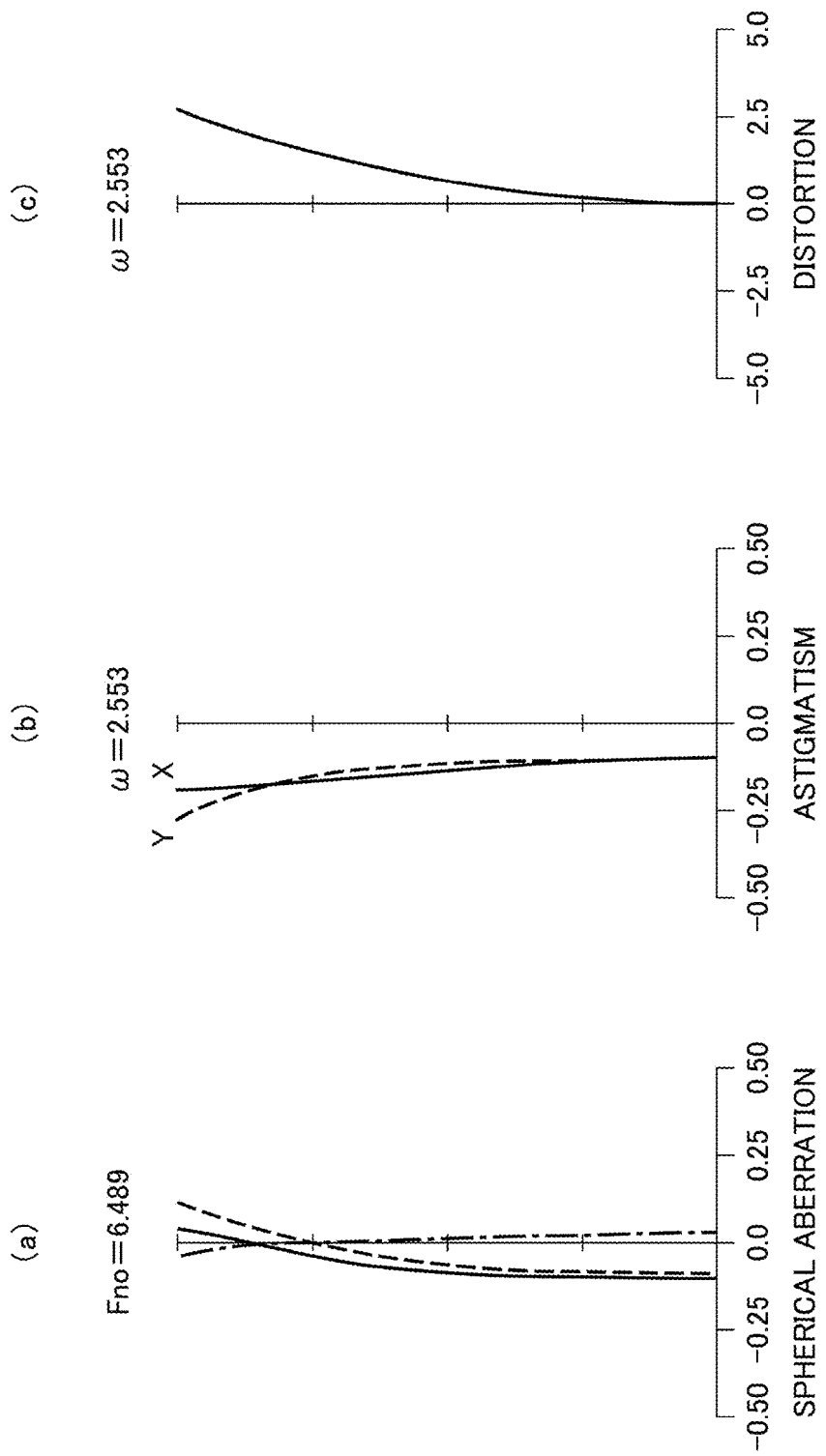
FIG. 12 depicts graphs of spherical aberration, astigmatism, and distortion aberration developed in the third embodiment of the zoom lens when the zoom lens taking a telephoto position is in focus on the point at infinity.

FIG. 9 is a vertical sectional view showing a lens arrangement of a third embodiment of the zoom lens according to the present invention. The third embodiment of the zoom lens comprises the foremost or first lens group G1 of positive refractive power located the closest to an object, the succeeding second lens group G2 of negative refractive power, the third lens group G3 of positive refractive power, the fourth lens group G4 of positive refractive power, and the fifth lens group G5 of negative refractive power, all the lens groups being arranged in this order.

The first lens group G1 comprises a duplet of a meniscus lens piece L1 of negative refractive power with its convex surface oriented to the object and a lens piece L2 of positive refractive power cemented with the meniscus lens piece L1, and a lens piece L3 of positive refractive power, all the lens pieces being arranged in this order from the closest to the object in the foremost position to the farthest in the rearmost position.

The second lens group G2 comprises a duplet of a lens piece L4 of positive refractive power with its convex surface oriented toward the object and a lens piece L5 of negative refractive power cemented with the lens piece L4, another duplet of a meniscus lens piece L6 of negative refractive power with its convex surface oriented toward the object and a lens piece L7 of positive refractive power cemented with the lens piece L6, and a meniscus lens piece L8 of negative refractive power with its concave surface oriented to the object.

The third lens group G3 comprises a biconvex lens piece L9, a biconvex lens piece L10, a duplet of a lens piece L11 of positive refractive power with its convex surface oriented to the object and a lens piece L12 of negative refractive power cemented with the lens piece L11, and another duplet of a biconcave lens piece L13 and a meniscus lens piece L14 of positive refractive power with its convex surface oriented to the object, and cemented with the biconcave lens piece L13, all the lens pieces being arranged in this order from the closest to the object in the foremost position to the farthest in the rearmost position.

The fourth lens group G4 comprises a biconvex lens piece L15, and a duplet of a lens piece L16 of positive refractive power with its convex surface oriented toward the object and a lens piece L17 of negative refractive power cemented with the lens piece L16, all the lens pieces being arranged in this order from the closest to the object in the foremost position to the farthest from the object in the rearmost position.

The fifth lens group G5 comprises a lens piece L18 of negative refractive power with its convex surface oriented toward the object, and a duplet of a biconcave lens piece L19 and a meniscus lens piece L20 of positive refractive power with its convex surface oriented to the object, and cemented with the lens piece L19, all the lens pieces being arranged in this order from the closest to the object in the foremost position to the farthest in the rearmost position.

During varying magnification from the wide-angle and to the telephoto end, the third embodiment of the zoom lens has its first lens group moved toward the object, its second lens group held in a fixed position, its third lens group moved on a trajectory that draws an arc toward the imaging plane relative to the second lens group, its fourth lens group moved on a trajectory that draws an arc toward the imaging plane relative to the third lens group, and its fifth lens group moved toward the object.

For focusing on an object at the near point, the fourth lens group is moved toward the object. The duplet of the cemented lens pieces L13 and L14 are moved in directions normal to the optical axis so as to correct fuzziness of an image during photographing.

Optical data of the third embodiment of the zoom lens are provided in Table 7.

TABLE 7

| NS | R | D | Nd | vd | ΔPgF |
|---|---|---|---|---|---|
| 1 | 297.9129 | 2.8300 | 1.83400 | 37.34 | |
| 2 | 135.0384 | 0.0200 | 1.56732 | 42.84 | |
| 3 | 135.0384 | 9.3000 | 1.49700 | 81.61 | 0.0375 |
| 4 | −4966.1736 | 0.3000 | | | |
| 5 | 146.0473 | 8.5000 | 1.49700 | 81.61 | 0.0375 |
| 6 | −1305.5193 | D(6) | | | |
| 7 | 213.6104 | 4.2002 | 1.80518 | 25.46 | |
| 8 | −62.5956 | 0.0100 | 1.56732 | 42.84 | |
| 9 | −62.5956 | 1.5700 | 1.74645 | 49.97 | |
| 10 | 144.9586 | 3.2900 | | | |
| 11 | 612.2359 | 1.4500 | 1.83404 | 40.21 | |
| 12 | 48.5752 | 0.0100 | 1.56732 | 42.84 | |
| 13 | 48.5752 | 3.2100 | 1.80518 | 25.46 | |
| 14 | 152.1415 | 2.4500 | | | |
| 15 | −71.1073 | 1.4200 | 1.90366 | 31.31 | |
| 16 | 2627.1686 | D(16) | | | |
| 17 | 97.4108 | 3.9312 | 1.49700 | 81.61 | |
| 18 | −83.4307 | 0.2000 | | | |
| 19 | 126.7004 | 3.1209 | 1.48749 | 70.44 | |
| 20 | −143.7416 | 0.2000 | | | |
| 21 | 69.4530 | 4.8712 | 1.48749 | 70.44 | |
| 22 | −68.6082 | 0.0100 | 1.56732 | 42.84 | |
| 23 | −68.6082 | 1.4200 | 1.90366 | 31.31 | |
| 24 | −2644.7437 | 12.0500 | | | |
| 25 | −271.3050 | 1.2500 | 1.82533 | 40.81 | |
| 26 | 28.0112 | 0.0100 | 1.56732 | 42.84 | |
| 27 | 28.0112 | 3.9500 | 1.89851 | 30.99 | |
| 28 | 101.7617 | 4.4401 | | | |
| 29 STOP | 0.0000 | D(29) | | | |
| 30 | 89.3134 | 3.7900 | 1.52994 | 52.35 | |
| 31 | −63.6313 | 0.2000 | | | |
| 32 | 36.8157 | 5.1142 | 1.50170 | 69.40 | |
| 33 | −56.3810 | 0.0100 | 1.56732 | 42.84 | |
| 34 | −56.3810 | 1.3200 | 1.90366 | 31.31 | |
| 35 | 1002.5920 | 0.0000 | | | |
| 36 | 0.0000 | D(36) | | | |
| 37 | 101.3957 | 1.2500 | 1.81828 | 43.28 | |
| 38 | 23.0588 | 5.9200 | | | |
| 39 | −51.4450 | 1.4000 | 1.48749 | 70.44 | |
| 40 | 26.1939 | 0.0100 | 1.56732 | 42.84 | |
| 41 | 26.1939 | 5.4332 | 1.72579 | 34.70 | |
| 42 | −206.0292 | D(42) | | | |
| 43 | 0.0000 | 2.0000 | 1.51680 | 64.20 | |
| 44 | 0.0000 | 1.0000 | | | |

Distances between the adjacent lens surfaces in several pairs in the third embodiment of the zoom lens are given in Table 8 below as well as varied values of the focal distance f, the F-number Fno, and the field angle ω for each of the photographing positions at the wide-angle position (f=153.8209), at the intermediate zooming range (f=286.8109), and at the telephoto position (f=485.2042), respectively.

TABLE 8

| f | 153.8209 | 286.8109 | 485.2042 |
|---|---|---|---|
| Fno | 4.95462 | 5.80954 | 6.48931 |
| ω | 8.0054 | 4.31340 | 2.55290 |
| D(6) | 64.9509 | 105.7871 | 129.7209 |
| D(16) | 29.9346 | 17.8473 | 2.2000 |
| D(29) | 27.7446 | 20.6475 | 22.7820 |
| D(36) | 9.7788 | 6.8423 | 4.4105 |
| D(42) | 51.3300 | 73.4510 | 89.3956 |

Distances between the adjacent lens surfaces in several pairs in the third embodiment of the zoom lens during focusing on an object at the near point for zooming settings at the wide-angle position (f=153.8209), at the intermediate zooming range (f=286.8109), and at the telephoto position (f=485.2042), respectively, are given in Table 9 below as well as varied values of the focal length f upon focusing on an object at infinite distance away and the distance D(0) from the front surface of the first lens piece to the object.

TABLE 9

| f | 153.8209 | 286.8109 | 485.2042 |
|---|---|---|---|
| D(0) | 2014.80 | 1973.96 | 1950.03 |
| D(29) | 26.0200 | 16.6583 | 13.9700 |
| D(36) | 11.5034 | 10.8315 | 13.2225 |

Embodiment 4

Figure 13:
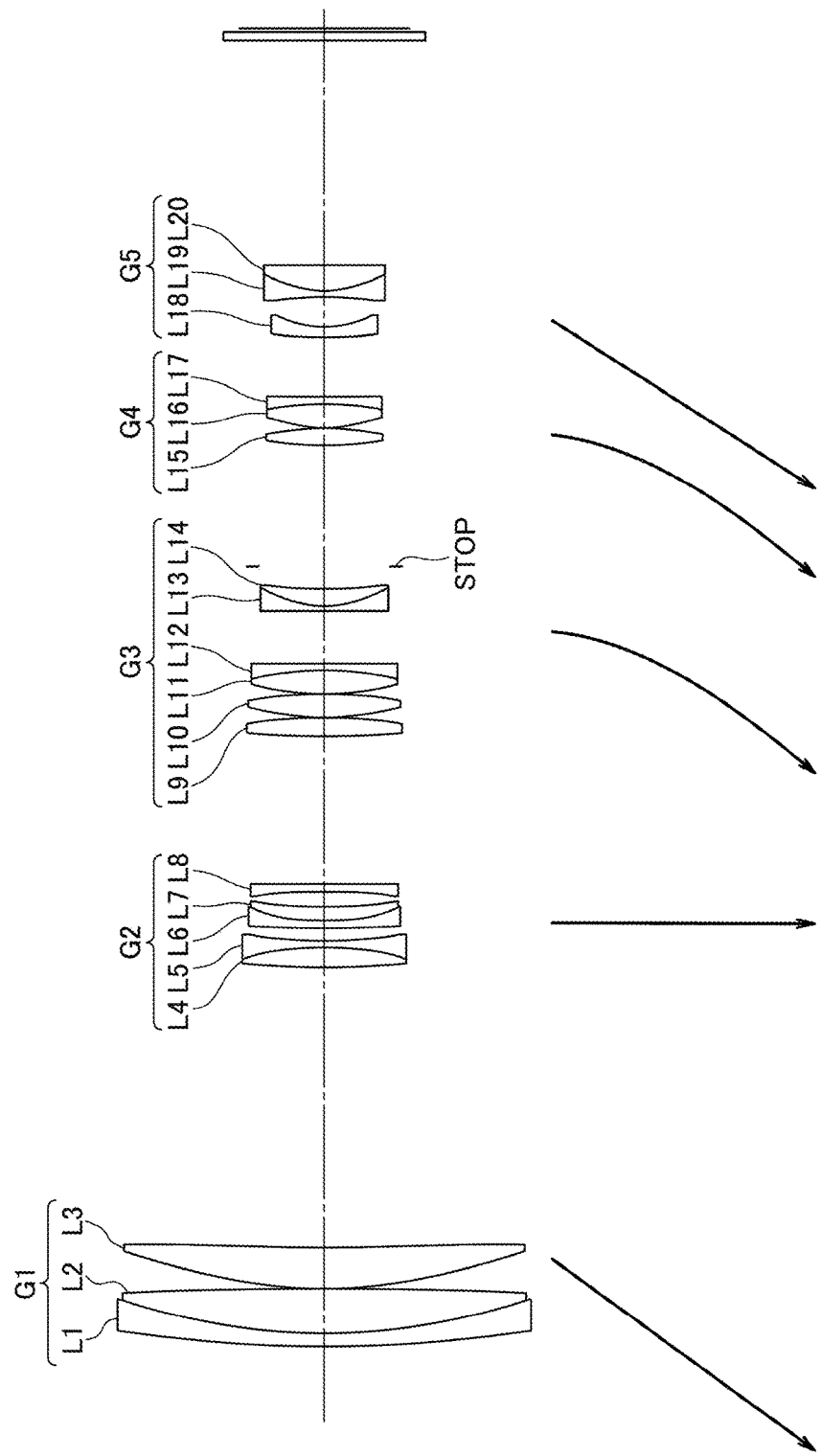
FIG. 13 is a vertical sectional view showing a fourth embodiment of the zoom lens according to the present invention when the zoom lens is taking a wide-angle position.
Figure 14:
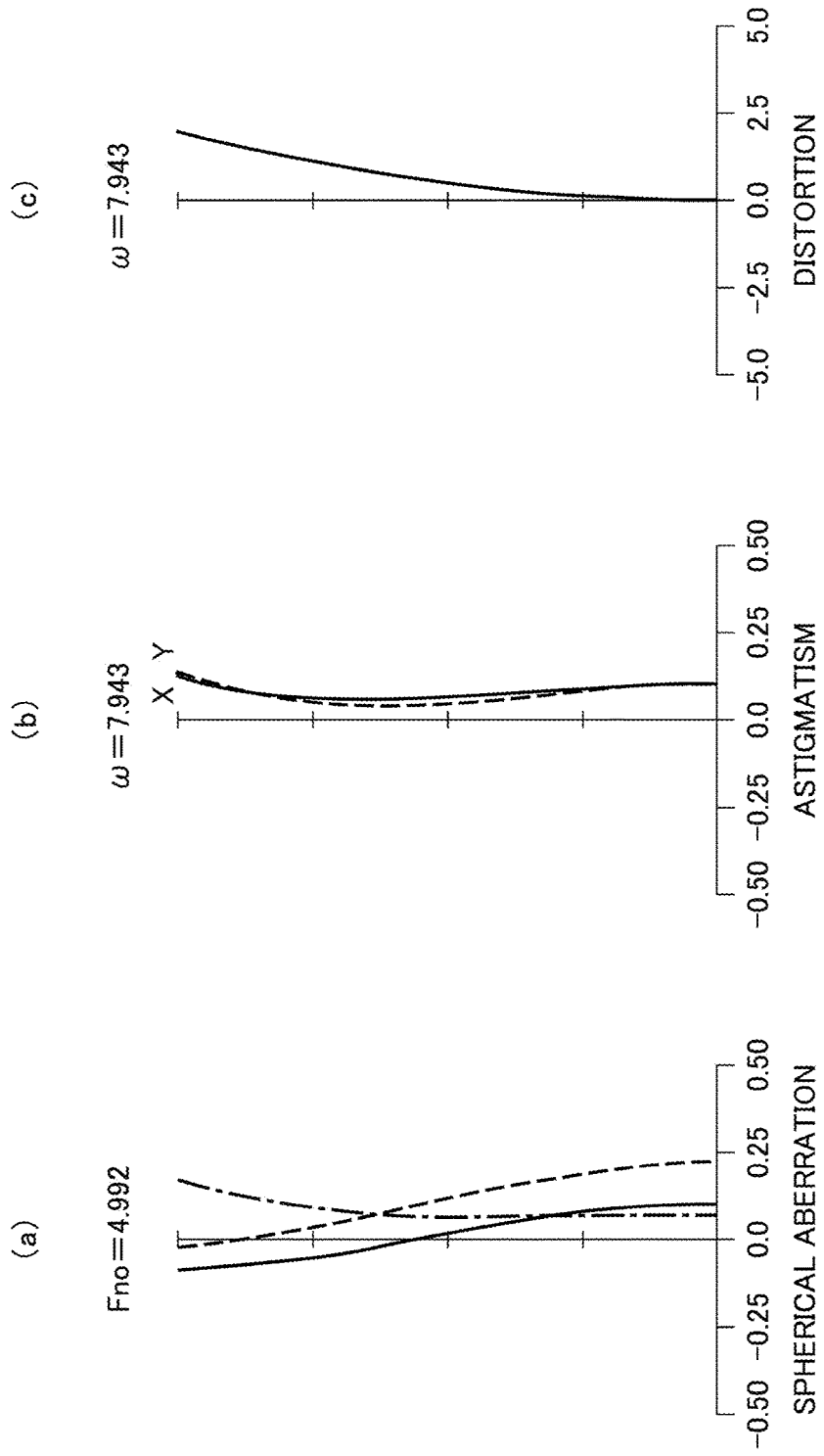
FIG. 14 depicts graphs of spherical aberration, astigmatism, and distortion aberration developed in the fourth embodiment of the zoom lens when the zoom lens taking a wide-angle position is in focus on the point at infinity.
Figure 15:
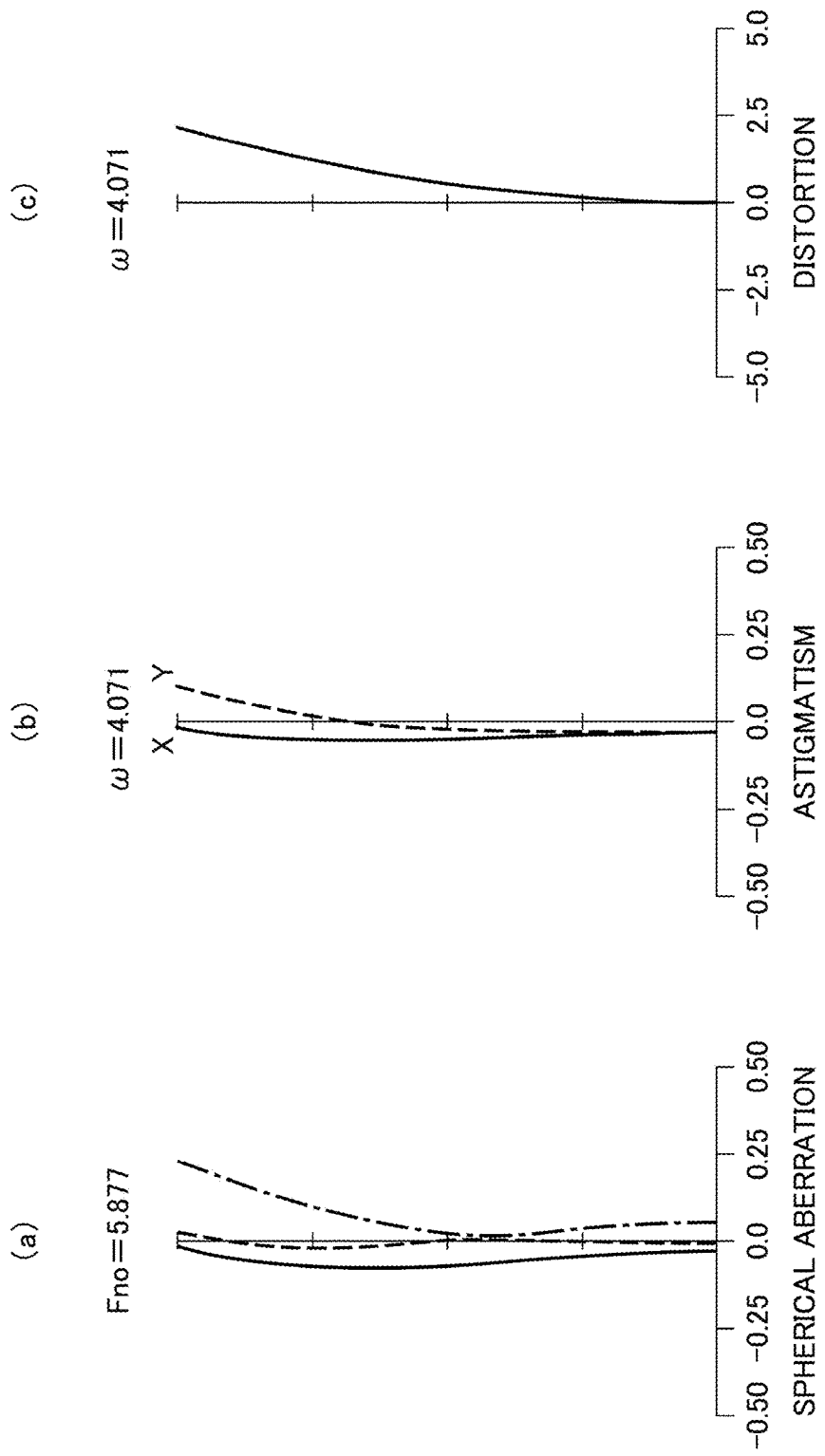
FIG. 15 depicts graphs of spherical aberration, astigmatism, and distortion aberration developed in the fourth embodiment of the zoom lens when the zoom lens taking an intermediate zooming range position is in focus on the point at infinity.
Figure 16:
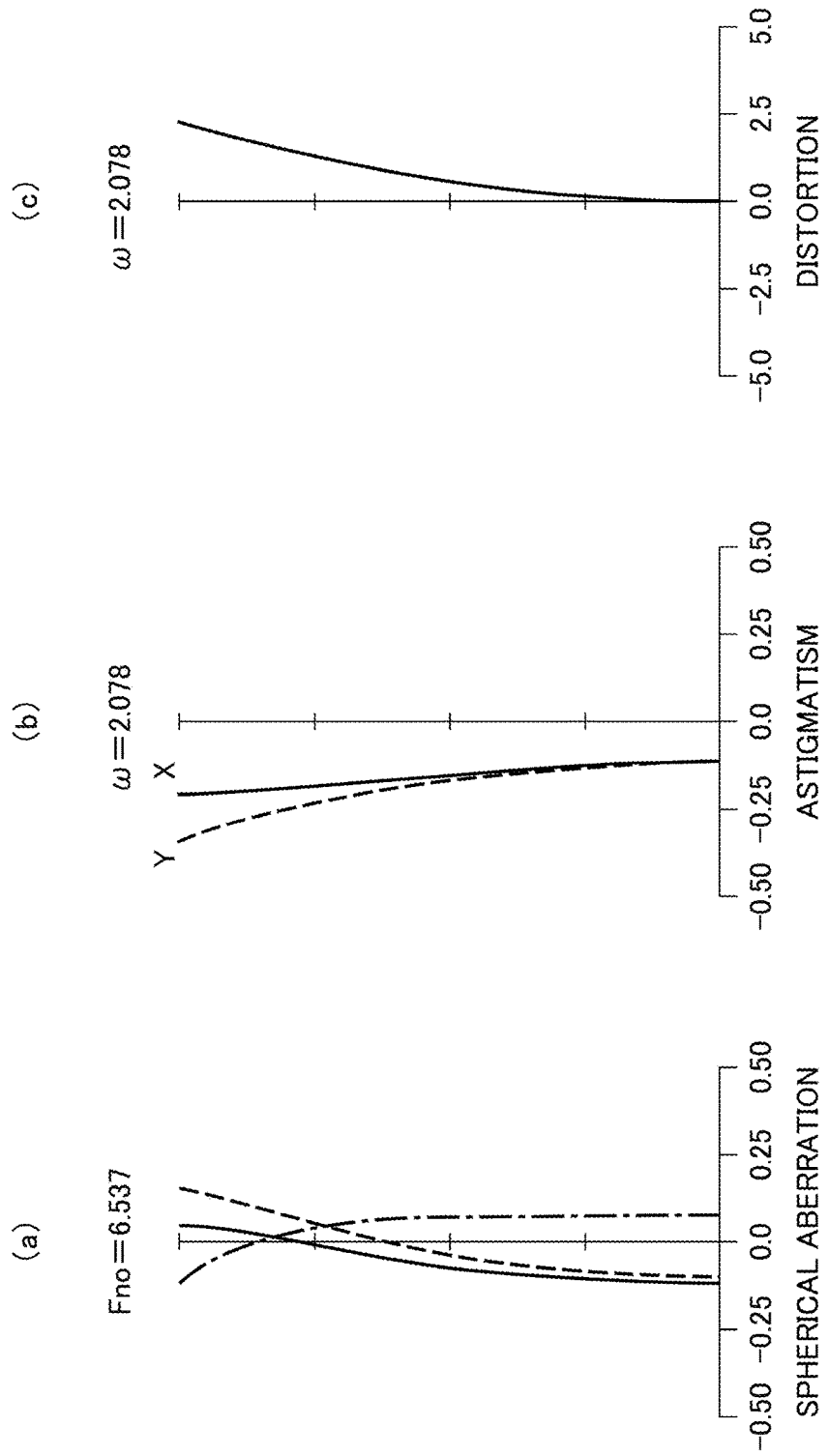
FIG. 16 depicts graphs of spherical aberration, astigmatism, and distortion aberration developed in the fourth embodiment of the zoom lens when the zoom lens taking a telephoto position is in focus on the point at infinity.

FIG. 13 is a vertical sectional view showing a lens arrangement of a fourth embodiment of the zoom lens according to the present invention. The fourth embodiment of the zoom lens comprises the foremost or first lens group G1 of positive refractive power located the closest to an object, the succeeding second lens group G2 of negative refractive power, the third lens group G3 of positive refractive power, the fourth lens group G4 of positive refractive power, and the fifth lens group G5 of negative refractive power, all the lens groups being arranged in this order.

The first lens group G1 comprises a duplet of a meniscus lens piece L1 of negative refractive power with its convex surface oriented to the object and a lens piece L2 of positive refractive power cemented with the meniscus lens piece L1, and a lens piece L3 of positive refractive power, all the lens pieces being arranged in this order from the closest to the object in the foremost position to the farthest in the rearmost position.

The second lens group G2 comprises a duplet of a lens piece L4 of positive refractive power with its convex surface oriented toward the object and a lens piece L5 of negative refractive power cemented with the lens piece L4, another duplet of a meniscus lens piece L6 of negative refractive power with its convex surface oriented toward the object and a lens piece L7 of positive refractive power cemented with the lens piece L6, and a meniscus lens piece L8 of negative refractive power with its concave surface oriented to the object.

The third lens group G3 comprises a biconvex lens piece L9, a biconvex lens piece L10, a duplet of a lens piece L11 of positive refractive power with its convex surface oriented to the object and a lens piece L12 of negative refractive power cemented with the lens piece L11, and another duplet of a biconcave lens piece L13 and a meniscus lens piece L14 of positive refractive power with its convex surface oriented to the object, and cemented with the biconcave lens piece L13, all the lens pieces being arranged in this order from the closest to the object in the foremost position to the farthest in the rearmost position.

The fourth lens group G4 comprises a biconvex lens piece L15, and a duplet of a lens piece L16 of positive refractive power with its convex surface oriented toward the object and a lens piece L17 of negative refractive power cemented with the lens piece L16, all the lens pieces being arranged in this order from the closest to the object in the foremost position to the farthest from the object in the rearmost position.

The fifth lens group G5 comprises a lens piece L18 of negative refractive power with its convex surface oriented toward the object, and a duplet of a biconcave lens piece L19 and a meniscus lens piece L20 of positive refractive power with its convex surface oriented to the object, and cemented with the lens piece L19, all the lens pieces being arranged in this order on the basis of the foremost first.

During shifting from the wide-angle position to the telephoto position to vary magnification, the fourth embodiment of the zoom lens has its first lens group moved toward the object, its second lens group held in a fixed position, its third lens group moved on a trajectory that draws an arc toward the imaging plane relative to the second lens group, its fourth lens group moved on a trajectory that draws an arc toward the imaging plane relative to the third lens group, and its fifth lens group moved toward the object.

For focusing on an object at the near point, the fourth lens group is moved toward the object. The duplet of the cemented lens pieces L13 and L14 are moved in directions normal to the optical axis so as to correct fuzziness of an image during photographing.

Optical data of the fourth embodiment of the zoom lens are provided in Table 10.

TABLE 10

| NS | R | D | Nd | vd | ΔPgF |
|---|---|---|---|---|---|
| 1 | 426.3567 | 3.0000 | 1.83400 | 37.34 | |
| 2 | 159.9066 | 0.0200 | 1.56732 | 42.84 | |
| 3 | 159.9066 | 10.0500 | 1.49700 | 81.61 | 0.0375 |
| 4 | −684.4955 | 0.3000 | | | |
| 5 | 140.0775 | 9.1000 | 1.49700 | 81.61 | 0.0375 |
| 6 | 8733.4134 | D(6) | | | |
| 7 | 558.1944 | 4.4000 | 1.80518 | 25.46 | |
| 8 | −61.1413 | 0.0100 | 1.56732 | 42.84 | |
| 9 | −61.1413 | 1.6000 | 1.72916 | 54.67 | |
| 10 | 177.9802 | 2.6000 | | | |
| 11 | 583.7869 | 1.5000 | 1.80450 | 39.64 | |
| 12 | 50.6562 | 0.0100 | 1.56732 | 42.84 | |
| 13 | 50.6562 | 3.4000 | 1.80518 | 25.46 | |
| 14 | 142.9473 | 3.7000 | | | |
| 15 | −73.8510 | 1.5000 | 1.90366 | 31.31 | |
| 16 | 515.2175 | D(16) | | | |
| 17 | 432.7323 | 4.1000 | 1.49700 | 81.61 | |
| 18 | −112.9310 | 0.2000 | | | |
| 19 | 73.5789 | 5.2184 | 1.48749 | 70.44 | |
| 20 | −95.0713 | 0.2000 | | | |
| 21 | 87.0854 | 5.1506 | 1.48749 | 70.44 | |
| 22 | −66.1655 | 0.0100 | 1.56732 | 42.84 | |
| 23 | −66.1655 | 1.5000 | 1.90366 | 31.31 | |
| 24 | −710.1255 | 12.5000 | | | |
| 25 | −236.4657 | 0.9000 | 1.74400 | 44.79 | |
| 26 | 27.5546 | 0.0100 | 1.56732 | 42.84 | |
| 27 | 27.5546 | 4.1589 | 1.80610 | 33.27 | |
| 28 | 99.2354 | 4.5500 | | | |
| 29 STOP | 0.0000 | D(29) | | | |
| 30 | 65.1174 | 4.1342 | 1.51742 | 52.15 | |
| 31 | −65.1174 | 0.2000 | | | |
| 32 | 50.5972 | 5.4000 | 1.51823 | 58.96 | |
| 33 | −48.1430 | 0.0100 | 1.56732 | 42.84 | |
| 34 | −48.1430 | 1.3000 | 1.90366 | 31.31 | |
| 35 | 1899.0359 | 0.0000 | | | |
| 36 | 0.0000 | D(36) | | | |
| 37 | 113.8672 | 2.2800 | 1.83481 | 42.72 | |
| 38 | 25.8597 | 6.9561 | | | |
| 39 | −55.4034 | 1.3000 | 1.48749 | 70.44 | |
| 40 | 29.6386 | 0.0100 | 1.56732 | 42.84 | |
| 41 | 29.6386 | 5.9000 | 1.72047 | 34.71 | |
| 42 | −175.0744 | D(42) | | | |
| 43 | 0.0000 | 2.0000 | 1.51680 | 64.20 | |
| 44 | 0.0000 | 1.0000 | | | |

Distances between the adjacent lens surfaces in several pairs in the fourth embodiment of the zoom lens are given in Table 11 below as well as varied values of the focal distance f, the F-number Fno, and the field angle ω for each of the photographing positions at the wide-angle position (f=152.1633), at the intermediate zooming range (f=297.4851), and at the telephoto position (f=582.52), respectively.

TABLE 11

| f | 152.1633 | 297.4851 | 582.5200 |
|---|---|---|---|
| Fno | 4.99224 | 5.87742 | 6.53711 |
| ω | 7.9436 | 4.07100 | 2.07820 |
| D(6) | 64.0000 | 111.2643 | 142.4400 |
| D(16) | 34.0551 | 23.2139 | 2.0400 |
| D(29) | 27.7980 | 17.1857 | 24.0639 |
| D(36) | 13.6386 | 8.2816 | 2.5000 |
| D(42) | 51.0000 | 77.8106 | 97.8880 |

Distances between the adjacent lens surfaces in several pairs in the fourth embodiment of the zoom lens during focusing on an object at the near point for photographing situation at the wide-angle position (f=152.1633), at the intermediate zooming range (f=297.4851), and at the telephoto position (f=582.52), respectively, are given in Table 12 below as well as varied values of the focal length f upon focusing on an object at infinite distance away and the distance D(0) from the front surface of the first lens piece to the object.

TABLE 12

| f | 152.1633 | 297.4851 | 582.5200 |
|---|---|---|---|
| D(0) | 2399.28 | 2352.02 | 2320.84 |
| D(29) | 26.1916 | 13.2535 | 12.8804 |
| D(36) | 15.2450 | 12.2138 | 13.6835 |

Embodiment 5

Figure 17:
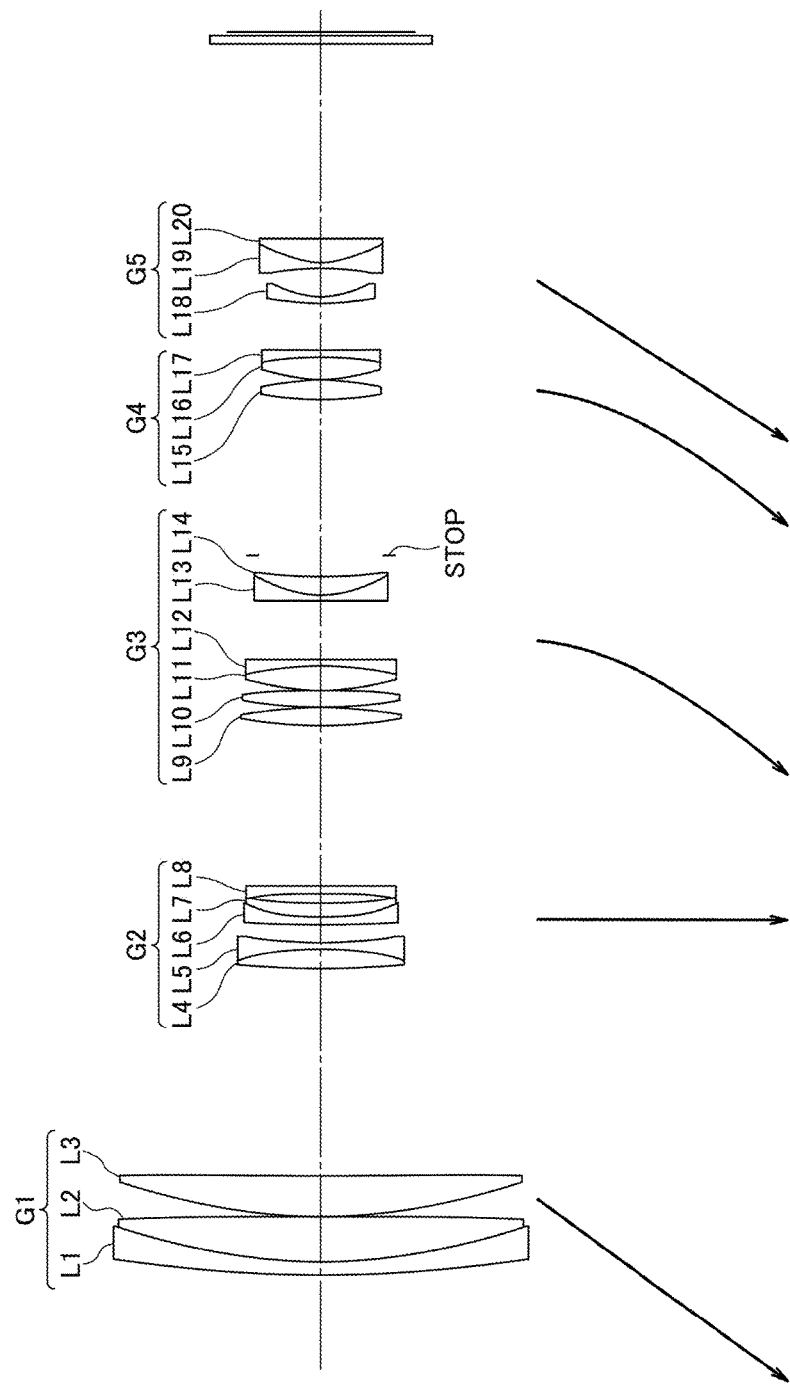
FIG. 17 is a vertical sectional view showing a fifth embodiment of the zoom lens according to the present invention when the zoom lens is taking a wide-angle position.
Figure 18:
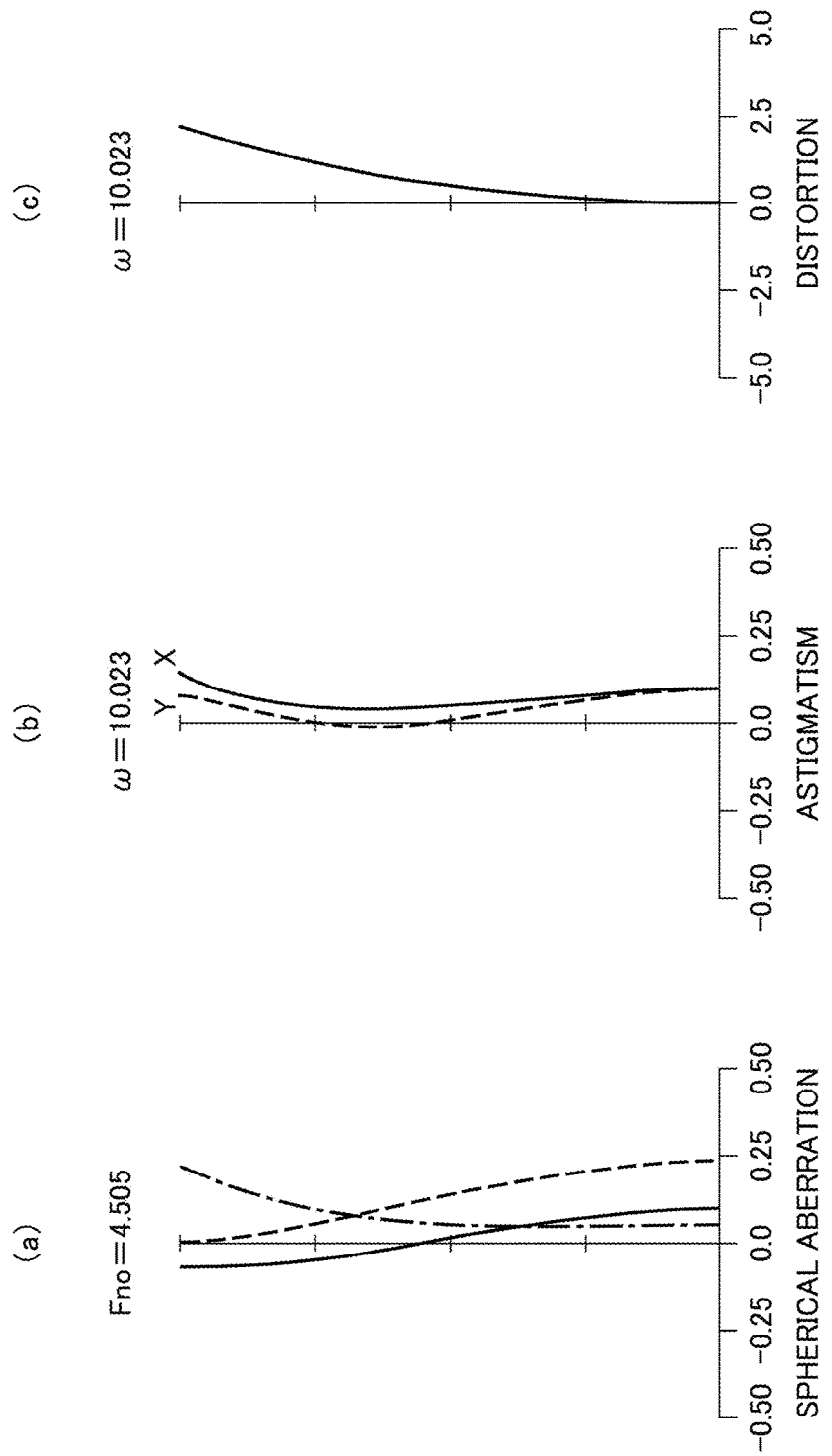
FIG. 18 depicts graphs of spherical aberration, astigmatism, and distortion aberration developed in the fifth embodiment of the zoom lens when the zoom lens taking a wide-angle position is in focus on the point at infinity.
Figure 19:
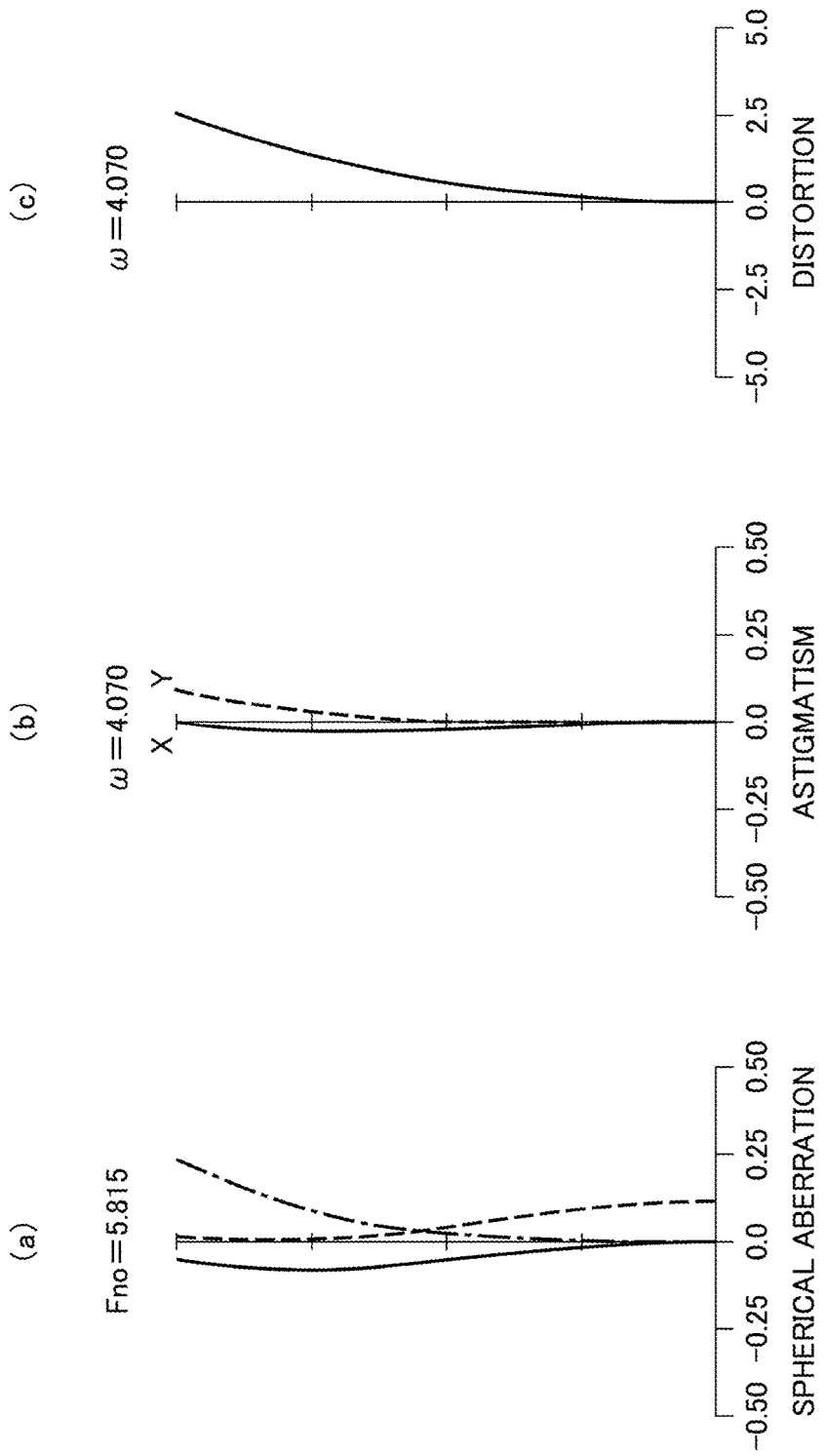
FIG. 19 depicts graphs of spherical aberration, astigmatism, and distortion aberration developed in the fifth embodiment of the zoom lens when the zoom lens taking an intermediate zooming range position is in focus on the point at infinity.
Figure 20:
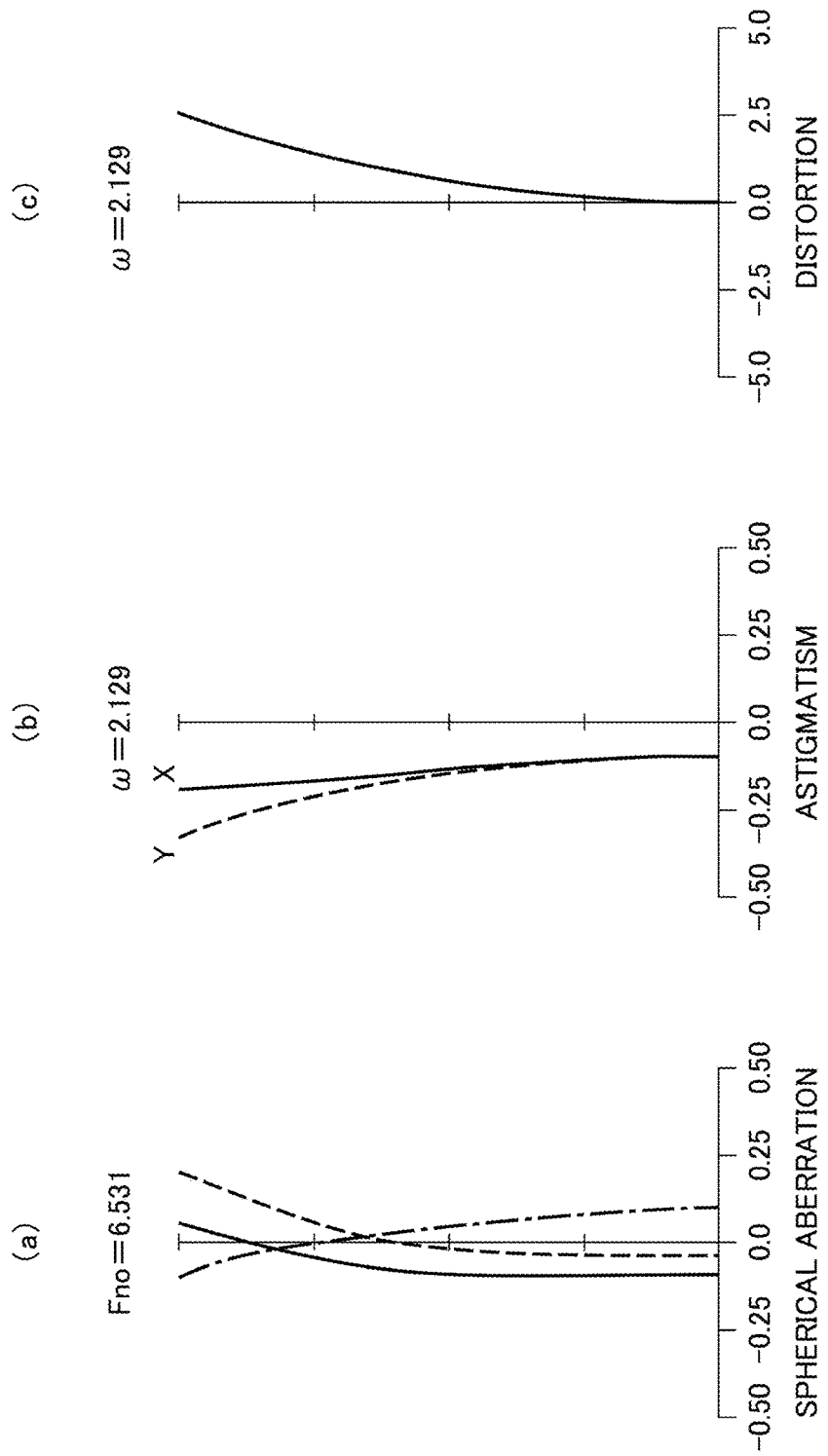
FIG. 20 depicts graphs of spherical aberration, astigmatism, and distortion aberration developed in the fifth embodiment of the zoom lens when the zoom lens taking a telephoto position is in focus on the point at infinity.

FIG. 17 is a vertical sectional view showing a lens arrangement of a fifth embodiment of the zoom lens according to the present invention. The fifth embodiment of the zoom lens comprises the foremost or first lens group G1 of positive refractive power located the closest to an object, the succeeding second lens group G2 of negative refractive power, the third lens group G3 of positive refractive power, the fourth lens group G4 of positive refractive power, and the fifth lens group G5 of negative refractive power, all the lens groups being arranged in this order.

In the fifth embodiment of the zoom lens, the first lens group G1 comprises a duplet of a meniscus lens piece L1 of negative refractive power with its convex surface oriented to the object and a lens piece L2 of positive refractive power cemented with the meniscus lens piece L1, and a meniscus lens piece L3 of positive refractive power with its convex surface oriented toward the object, all the lens pieces being arranged in this order from the closest to the object in the foremost position to the farthest from the object in the rearmost position.

The second lens group G2 comprises a duplet of a lens piece L4 of positive refractive power with its convex surface oriented toward the object and a lens piece L5 of negative refractive power cemented with the lens piece L4, another duplet of a meniscus lens piece L6 of negative refractive power with its convex surface oriented toward the object and a lens piece L7 of positive refractive power cemented with the lens piece L6, and a meniscus lens piece L8 of negative refractive power with its concave surface oriented to the object.

The third lens group G3 comprises a biconvex lens piece L9, a biconvex lens piece L10, a duplet of a biconvex lens piece L11 and a lens piece L12 of negative refractive power cemented with the lens piece L11, and another duplet of a biconcave lens piece L13 and a meniscus lens piece L14 of positive refractive power with its convex surface oriented to the object, and cemented with the biconcave lens piece L13, all the lens pieces being arranged in this order from the closest to the object in the foremost position to the farthest in the rearmost position.

The fourth lens group G4 comprises a biconvex lens piece L15, and a duplet of a biconvex lens piece L16 and a lens piece L17 of negative refractive power cemented with the lens piece L16, all the lens pieces being arranged in this order from the closest to the object in the foremost position to the farthest from the object in the rearmost position.

The fifth lens group G5 comprises a lens piece L18 of negative refractive power with its convex surface oriented toward the object, and a duplet of a biconcave lens piece L19 and a biconvex lens piece L20 cemented with the lens piece L19, all the lens pieces being arranged in this order on the basis of the foremost first.

During shifting from the wide-angle position to the telephoto position to vary magnification, the fifth embodiment of the zoom lens has its first lens group moved toward the object, its second lens group held in a fixed position, its third lens group moved on a trajectory that draws an arc toward the imaging plane relative to the second lens group, its fourth lens group moved on a trajectory that draws an arc toward the imaging plane relative to the third lens group, and its fifth lens group moved toward the object.

For focusing on an object at the near point, the fourth lens group is moved toward the object. The duplet of the cemented lens pieces L13 and L14 are moved in directions normal to the optical axis so as to correct fuzziness of an image during photographing.

Optical data of the fifth embodiment of the zoom lens are provided in Table 13.

TABLE 13

| NS | R | D | Nd | vd | ΔPgF |
|---|---|---|---|---|---|
| 1 | 343.2915 | 3.0000 | 1.83400 | 37.34 | |
| 2 | 145.9091 | 0.0200 | 1.56732 | 42.84 | |
| 3 | 145.9091 | 10.0500 | 1.49700 | 81.61 | 0.0375 |
| 4 | −1465.0143 | 0.3000 | | | |
| 5 | 146.8570 | 9.3000 | 1.49700 | 81.61 | 0.0375 |
| 6 | −2192.2330 | D(6) | | | |
| 7 | 247.8836 | 4.5000 | 1.80518 | 25.46 | |
| 8 | −60.9978 | 0.0100 | 1.56732 | 42.84 | |
| 9 | −60.9978 | 1.6000 | 1.75243 | 49.57 | |
| 10 | 122.8808 | 3.5590 | | | |
| 11 | −3272.8176 | 1.5000 | 1.83888 | 39.37 | |
| 12 | 44.9185 | 0.0100 | 1.56732 | 42.84 | |
| 13 | 44.9185 | 3.5140 | 1.80518 | 25.46 | |
| 14 | 172.9348 | 2.7259 | | | |
| 15 | −65.8855 | 1.5000 | 1.90366 | 31.31 | |
| 16 | −8818.9517 | D(16) | | | |
| 17 | 107.5605 | 4.2567 | 1.49700 | 81.61 | |

TABLE 13-continued

| NS | R | D | Nd | vd | ΔPgF |
|---|---|---|---|---|---|
| 18 | −82.4101 | 0.2000 | | | |
| 19 | 131.8612 | 3.5227 | 1.48749 | 70.44 | |
| 20 | −137.2545 | 0.2000 | | | |
| 21 | 74.0878 | 5.3399 | 1.48749 | 70.44 | |
| 22 | −69.9110 | 0.0100 | 1.56732 | 42.84 | |
| 23 | −69.9110 | 1.5000 | 1.90366 | 31.31 | |
| 24 | −2310.5069 | 13.5458 | | | |
| 25 | −220.8383 | 1.2000 | 1.71680 | 45.46 | |
| 26 | 29.9133 | 0.0100 | 1.56732 | 42.84 | |
| 27 | 29.9133 | 4.1500 | 1.80610 | 33.27 | |
| 28 | 95.4308 | 5.0000 | | | |
| 29 STOP | 0.0000 | D(29) | | | |
| 30 | 80.8865 | 4.1200 | 1.50860 | 59.40 | |
| 31 | −64.5149 | 0.2000 | | | |
| 32 | 37.7400 | 5.4200 | 1.50623 | 60.42 | |
| 33 | −57.0230 | 0.0100 | 1.56732 | 42.84 | |
| 34 | −57.0230 | 1.3000 | 1.90366 | 31.31 | |
| 35 | 797.3134 | D(35) | | | |
| 36 | 94.7210 | 1.3000 | 1.82563 | 41.77 | |
| 37 | 24.4742 | 6.4000 | | | |
| 38 | −55.8634 | 1.3000 | 1.48749 | 70.44 | |
| 39 | 25.9416 | 0.0100 | 1.56732 | 42.84 | |
| 40 | 25.9416 | 5.6800 | 1.65673 | 32.70 | |
| 41 | −226.3658 | D(41) | | | |
| 42 | 0.0000 | 2.0000 | 1.51680 | 64.20 | |
| 43 | 0.0000 | 1.0000 | | | |

Distances between the adjacent lens surfaces in several pairs in the fifth embodiment of the zoom lens are given in Table 14 below as well as varied values of the focal distance f, the F-number Fno, and the field angle ω for each of the photographing positions at the wide-angle position (f=122.40), at the intermediate zooming range (f=304.04), and at the telephoto position (f=582.00), respectively.

TABLE 14

| f | 122.4004 | 304.0417 | 582.0046 |
|---|---|---|---|
| Fno | 4.5047 | 5.8152 | 6.5310 |
| ω | 10.023 | 4.070 | 2.129 |
| D(6) | 46.8750 | 111.4683 | 141.3470 |
| D(16) | 36.4322 | 21.0752 | 2.0150 |
| D(29) | 35.2507 | 19.3740 | 24.5725 |
| D(35) | 10.8554 | 6.7810 | 3.9750 |
| D(41) | 43.9427 | 79.2508 | 95.9185 |

Distances between the adjacent lens surfaces in several pairs in the fifth embodiment of the zoom lens during focusing on an object at the near point for photographing situation at the wide-angle position (f=122.40), at the intermediate zooming range (f=304.04), and at the telephoto position (f=582.00), respectively, are given in Table 15 below as well as varied values of the focal length f upon focusing on an object at infinite distance away and the distance D(0) from the front surface of the first lens piece to the object.

TABLE 15

| f | 122.40 | 304.04 | 582.52 |
|---|---|---|---|
| D(0) | 2217.380 | 2152.787 | 2122.908 |
| D(29) | 34.11145 | 15.72925 | 14.53497 |
| D(35) | 11.99467 | 10.42577 | 14.01258 |

The values of the terms in the conditional expressions (1) to (4) regarding the first to fifth embodiments of the present invention are given in Table 16 below:

TABLE 16

| | Embodiment | | | | |
|---|---|---|---|---|---|
| | 1 | 2 | 3 | 4 | 5 |
| βbt in the conditional expression (1) | 3.3442 | 3.7120 | 3.3690 | 3.3060 | 3.5770 |
| f1/√(fw · fT) in the conditional expression (2) | 0.7965 | 0.8312 | 0.8788 | 0.8265 | 0.9242 |
| ΔPgF in the conditional expression (3) | 0.0375 | 0.0375 | 0.0375 | 0.0375 | 0.0375 |
| Lt/fT in the conditional expression (4) | 0.6207 | 0.6457 | 0.7213 | 0.6509 | 0.6479 |

We claim:

1. A zoom lens having a telephoto end and a wide angle end, and comprising in order from the object side a first lens group having a positive refractive power, a second lens group having a negative refractive power, a third lens group having a positive refractive power, a fourth lens group having a positive refractive power, and a fifth lens group,
   wherein the following conditional expression (2) is satisfied:

$$0.7965 \leq f1/\sqrt{(fw \times fT)} \leq 1.3 \quad (2)$$

where fw is a focal length of the zoom lens taking a wide-angle position, fT is a focal length of the zoom lens taking a telephoto position, and f1 is a focal length of the first lens group,
   wherein the first lens group comprises at least one lens piece that satisfies the following conditional expression (3):

$$0.018 \leq \Delta PgF \quad (3)$$

where PgF is the partial dispersion for glass for the respective wavelengths 435.8 nm, 486.1 nm, and 656.3 nm of spectral lines g, F, and C, given by the following expression (3):

$$PgF = (ng - nF)/(nF - nC),$$

where ng, nF, and nC are the refractive indices for the respective wavelengths 435.8 nm, and 486.1 nm, and 656.3 nm of spectral lines g, F, and C, and
   ΔPgF is a deviation from a straight line defined by a first point having as its x, y coordinates the Abbe constant on the d-line νd=60.49 and the partial dispersion PgF=0.5393 for a glass type C7 and a second point having as its x, y coordinates the Abbe constant on the d-line νd=36.30 and the partial dispersion PgF=0.5829 for a glass type F2, where the Abbe constant on the d-line νd is given by the following expression:

$$\nu d = (nd - 1)/(nF - nC),$$

where nd is the refractive index for the wavelength 589.6 nm of spectral line d,
   wherein the following conditional expression (4) is satisfied:

$$0.60 \leq Lt/fT \leq 0.75 \quad (4)$$

where Lt is an entire length of the optical system of the zoom lens taking a telephoto position, and fT is a focal length of the same of the zoom lens at the telephoto position,
   wherein the second lens group is held in a fixed position while all the other lens groups are displaced when zooming from a wide-angle position to a telephoto position to vary magnification,
   wherein a surface closest to the object side of the third lens group is convex toward the object side,
   wherein the third lens group is an immediately adjacent lens group to the fourth lens group, and
   wherein during zooming from a wide-angle end to a telephoto end, the third lens group is axially moved toward the object side.

2. The zoom lens according to claim 1, wherein the following conditional expression (1) is satisfied:

$$3.1 \leq \beta bt \leq 4.0 \quad (1)$$

where βbt denotes a combined lateral magnification of all lens groups at the telephoto end, rearward of the fourth lens group.

3. The zoom lens according to claim 1, wherein the fifth lens group has a negative refractive power.

4. The zoom lens according to claim 1, wherein the zoom lens comprises an aperture stop closer to the imaging plane than the second lens group, and at least some of the lens groups closer to the imaging plane than the aperture stop are displaceable along the optical axis to shift a focal point from the point at infinity to an object at the near point.

5. The zoom lens according to claim 1, wherein the zoom lens further comprises a sixth lens group closer to the imaging plane than the fifth lens group displaced toward the object during shifting from the wide-angle position to the telephoto position to vary magnification.

6. A camera device comprising:
   the zoom lens according to claim 1 and
   a solid-state image sensor disposed on or behind the imaging plane of the zoom lens for converting an optical image created by the zoom lens into electrical signals.

* * * * *